(12) United States Patent
Harano

(10) Patent No.: US 9,594,990 B2
(45) Date of Patent: Mar. 14, 2017

(54) IMAGE PROCESSING APPARATUS, PRINT PROCESSING METHOD, AND STORAGE MEDIUM

(71) Applicant: CANON KABUSHIKI KAISHA, Tokyo (JP)

(72) Inventor: Yuzo Harano, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/836,686

(22) Filed: Aug. 26, 2015

(65) Prior Publication Data

US 2016/0063366 A1  Mar. 3, 2016

(30) Foreign Application Priority Data

Sep. 1, 2014  (JP) ................ 2014-177133

(51) Int. Cl.
*G06K 15/00* (2006.01)
*G06F 3/12* (2006.01)
*H04N 1/32* (2006.01)
*G06K 15/02* (2006.01)

(52) U.S. Cl.
CPC ....... *G06K 15/4095* (2013.01); *G06F 3/1222* (2013.01); *G06F 3/1238* (2013.01); *G06F 3/1267* (2013.01); *G06F 3/1285* (2013.01); *H04N 1/32384* (2013.01); *H04N 1/32459* (2013.01); *H04N 1/32486* (2013.01); *G06K 15/1809* (2013.01); *G06K 15/1886* (2013.01); *H04N 2201/0094* (2013.01)

(58) Field of Classification Search
None
See application file for complete search history.

(56) References Cited

U.S. PATENT DOCUMENTS

2008/0244756 A1\* 10/2008 Kitada .................... G06F 21/31
726/28

FOREIGN PATENT DOCUMENTS

JP    9-305331 A    11/1997
JP    2006-18654 A   1/2006

\* cited by examiner

*Primary Examiner* — Dov Popovici
(74) *Attorney, Agent, or Firm* — Canon USA Inc., IP Division

(57) ABSTRACT

An image processing apparatus and a control method is provided. The apparatus and method provides that, when a print job to be re-executed is stored, deletes authentication information required for an authentication function in a printing system from among print attributes included in the print job, and then stores the print job in the printing system.

11 Claims, 13 Drawing Sheets

IMAGE PROCESSING APPARATUS, PRINT PROCESSING METHOD, AND STORAGE MEDIUM

BACKGROUND

Field

Aspects of the present invention generally relate to an image processing apparatus that performs processing on a print job.

Description of the Related Art

Some printing systems have functions of applying various types of processing to a print job. One of such functions is a function of storing a print job, on which a series of processing has been completed, in the printing system mainly for the reprinting to be performed later (see Japanese Patent Application Laid-Open No. 9-305331). Various settings related to printing are specified for a print job as print attributes. For example, user information, printing sheet settings, image processing settings, and finishing settings are specified as the print attributes. The printing system performs print processing based on such print attributes. After completing the entire print processing, the print job is stored into the printing system along with the print attributes.

Some printing systems have a function of performing authentication on a print job and applying processing according to the result of the authentication (see Japanese Patent Application Laid-Open No. 2006-18654). Such a printing system performs user authentication during print processing of a print job, for example, by using user information set in the print job. The print processing is continued only if the user information set in the print job matches user information set in the printing system in advance. If they do not match each other, the print processing is aborted.

A printing system may have both the function of storing a print job, on which a series of processing has been completed, into the printing system and the function of applying processing according to an authentication result to a print job. Such a printing system stores a print job therein in a state at a time point at which the last processing on the print job is completed. In other words, the print job holds all the print attributes at the time point at which the print job is finally stored. Such print attributes include the user information used for the authentication (for example, a username and a password required for the authentication of the print job in the printing system).

However, when the print job is subsequently reprinted, the user information is not necessarily the same as that of the user who gives an instruction to perform reprinting. For example, suppose that a print job stored in the printing system was instructed to be printed by a user A in the past. Then, for example, a user B gives an instruction to reprint the print job without changing at least the user information among the print attributes stored in the print job.

In such a case, even if the print job is instructed to be executed by the user B, the printing system determines that the user information about the user A stored in the print job matches the user information about the user A set in the printing system in advance. Thus, the printing system authenticates the print job as one instructed to be executed by the user A. As a result, authentication based on the user (user information) who actually gives the instruction to execute the print job and various types of counting related to printing may fail to be performed properly.

As described above, if there is a mismatch between the user who actually gives an instruction to execute the print job and the user who is authenticated by the printing system, the presence of the function of storing the print job can reduce the reliability and security of the authentication function in the printing system.

SUMMARY

Aspects of the present invention are generally directed to a printing system capable of suppressing the occurrence of a mismatch between a user who gives an instruction to execute a print job stored for re-execution and a user who is authenticated by the printing system.

According to an aspect of the present invention, an image processing apparatus configured to communicate with a printing apparatus that processes a print job including authentication information used when authentication whether to permit print processing is performed, includes a transferring unit configured to transfer the print job to the printing apparatus, a storage unit configured to store the print job for reprinting, and a deletion unit configured to delete the authentication information included in the print job on which the print processing has been performed.

Further features of the present disclosure will become apparent from the following description of exemplary embodiments with reference to the attached drawings.

DESCRIPTION OF THE EMBODIMENTS

Exemplary embodiments will be described below with reference to the drawings.

A first exemplary embodiment will be described in detail.

Figure 1:
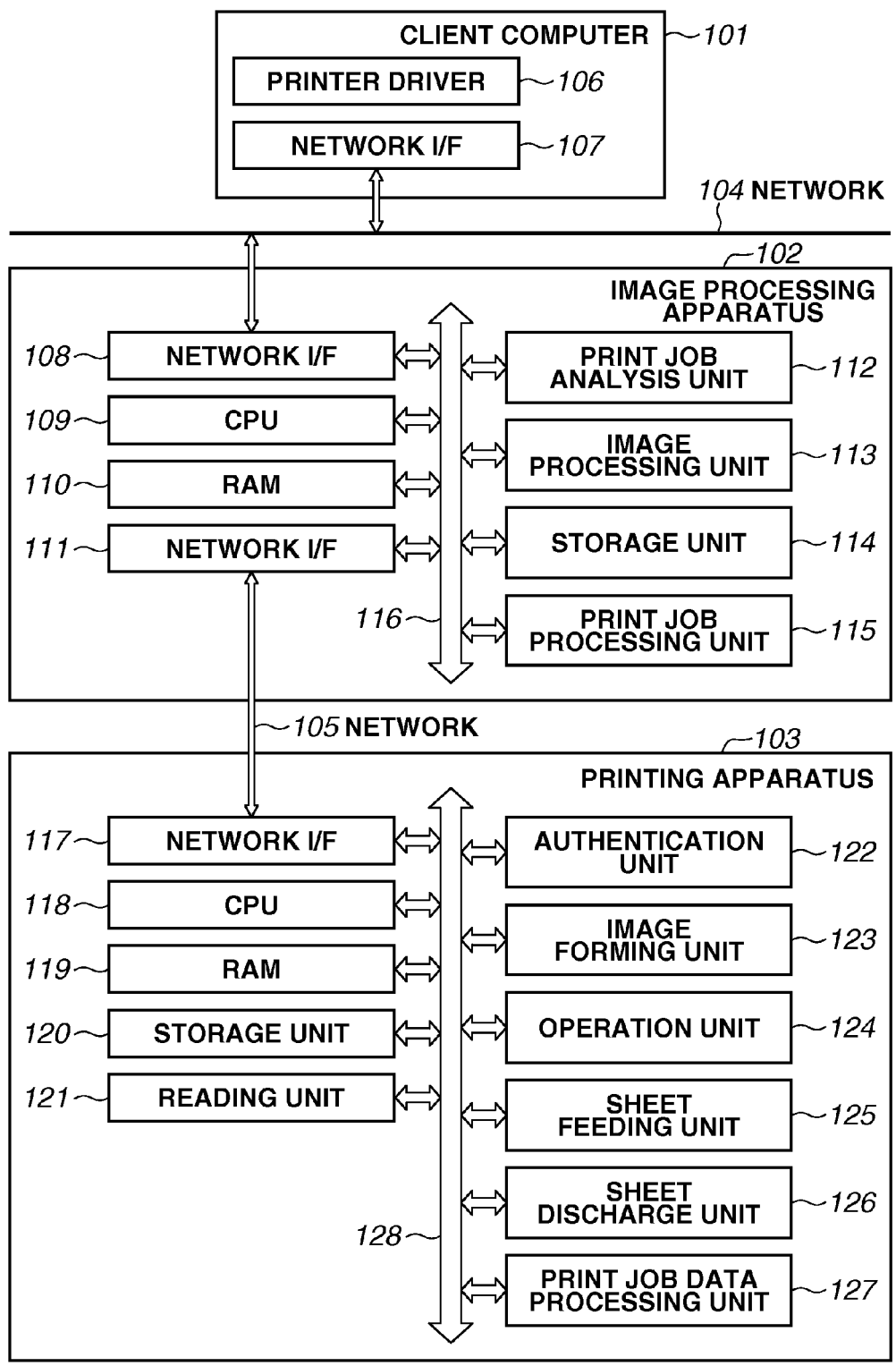
FIG. 1 is a block diagram illustrating a configuration of a printing system.

FIG. 1 is a block diagram illustrating an example of an overall configuration of a printing system. The printing system may be constituted by a single apparatus or a plurality of apparatuses as long as print processing and other functions described below are implemented. In the printing system, a plurality of apparatuses mutually communicably connected via a network such as a local area network (LAN) and a wide area network (WAN) may perform processing. In other words, the system configuration obtained by connecting various terminals described in the following exemplary embodiments is just an example. There may be various configuration examples according to the intended uses and purposes.

In the example illustrated in FIG. 1, the printing system includes a client computer 101, an image processing apparatus 102, a printing apparatus 103, a network 104, and a network 105.

The client computer 101 is an apparatus on which a printer driver 106 is installed. The client computer 101 is connected to the network 104 via a network interface (I/F) 107. In the present exemplary embodiment, the client computer 101 is described as an information processing apparatus.

The printer driver 106 is a kind of software running on an operating system (OS) that controls the client computer 101. The client computer 101 expresses print data in a page description language (PDL) according to a print instruction from an application. The client computer 101 transmits a print job including the print data expressed in the PDL to the image processing apparatus 102.

The network I/F 107 connects to and communicates with an external apparatus via the network 104. The network I/F 107 performs communication control processing on the network 104. For example, the network I/F 107 enables transmission and reception of data with the image processing apparatus 102. The network I/F 107 also enables Internet communications using the Transmission Control Protocol/Internet Protocol (TCP/IP) method.

The information processing apparatus typically includes a central processing unit (CPU), a hard disk drive (HDD), a random access memory (RAM), and various input/output devices. Since such components are general-purpose ones, a detailed description thereof will be omitted in the present exemplary embodiment.

The image processing apparatus 102 includes a network I/F 108, a CPU 109, a RAM 110, a network I/F 111, a print job analysis unit 112, an image processing unit 113, a storage unit 114, and a print job processing unit 115. Such units are mutually connected to be communicable by a system bus 116. In the present exemplary embodiment, the image processing apparatus 102 is described as a printer controller. A printer controller is mainly in charge of image processing. For example, the printer controller receives drawing data described in the PDL, generated by the printer driver 106. The printer controller interprets and converts the PDL into print image data, and then outputs the print image data to the printing apparatus 103 to be described below.

Such an information processing apparatus typically has a configuration such that a hardware electronic circuit board on which an integrated circuit dedicated to image processing is mounted is added to a computer serving as a general-purpose information processing apparatus. However, the image processing may be performed only by a software program or programs.

The network I/F 108 connects to and communicates with an external apparatus via the network 104. The network I/F 108 performs communication control processing on the network 104. For example, the network I/F 108 enables transmission and reception of data with the client computer 101, as well as Internet communications using the TCP/IP method.

The CPU 109 loads various programs stored in the storage unit 114 of the image processing apparatus 102 into the RAM 110, and executes the programs loaded in the RAM 110, thereby performing various types of arithmetic processing, information processing, and device control.

The RAM 110 is a kind of common volatile storage device that is directly accessible from the CPU 109. The RAM 110 is used as a work area of the CPU 109. The RAM 110 is also used to store temporary data.

The network I/F 111 connects to and communicates with an external apparatus via the network 105. The network I/F 111 performs communication control processing on the network 105. For example, the network I/F 111 enables Internet communications using the TCP/IP method, and transmission and reception of data with the printing apparatus 103.

The print job analysis unit 112 analyzes the print job received by the network I/F 111 to obtain print image information and print attribute information. The print image information refers to the drawing data described in the PDL. The print attribute information includes information about the type of a path for processing the print job, and information about various print settings such as page settings, sheet feeding, job information, and finishing. Paths for processing a print job will be described below with reference to FIG. 3. One of pieces of job information is authentication information, which will be described below with reference to FIG. 4.

The image processing unit 113 interprets the PDL included in the print job, and performs raster image processor (RIP) processing using the interpreted result, the print image information, and the print attribute information. Based on the result of the RIP processing, the image processing unit 113 generates print image data that is page-by-page raster data. The PDL refers to a language used for describing commands for controlling a page printer. Examples of the PDL include PostScript (PS) and Printer Control Language (PCL).

The print image data generated by the image processing unit 113 and the print attribute information are transferred to the printing apparatus 103 via the network I/F 111 as print job data under control of the print job processing unit 115 to be described below.

The storage unit 114 is in charge of temporarily or permanently spooling and storing the print job received from the client computer 101. In the present exemplary embodiment, the storage unit 114 is described as an HDD.

The print job processing unit 115 performs control to play a central role of the image processing 102, such as overall control of the image processing apparatus 102 and control of processing of the print job. The control of processing of the print job will be described below with reference to FIG. 3.

In the present exemplary embodiment, the print job processing unit 115 performs the following processing in addition to the overall control of the image processing apparatus 102 and the control of processing of the print job. Specifically, after completing a series of print processing by the printing apparatus 103, the print job processing unit 115 deletes authentication information required for determination by an authentication unit 122 among print attributes included in the print job, and stores the print job from which the authentication information is deleted into the storage unit 114.

The printing apparatus 103 includes a network I/F 117, a CPU 118, a RAM 119, a storage unit 120, a reading unit 121, an authentication unit 122, an image forming unit 123, an operation unit 124, a sheet feeding unit 125, a sheet discharge unit 126, and a print job data processing unit 127. Such units are mutually connected to be communicable by a system bus 128. In the present exemplary embodiment, the printing apparatus 103 is described as a multifunction peripheral (MFP). The MFP includes a copy function, a printer function, and a facsimile (FAX) function.

The network I/F 117 connects to and communicates with an external apparatus via the network 105. The network I/F 117 performs communication control processing on the network 105. For example, the network I/F 117 enables transmission and reception of data with the image processing apparatus 102, and Internet communications using the TCP/IP method.

The CPU 118 loads various programs stored in the storage unit 120 of the printing apparatus 103 into the RAM 119 and executes the programs loaded in the RAM 119, thereby performing various types of processing (arithmetic processing, information processing, and device control).

The RAM 119 is a kind of common volatile storage device that is directly accessible from the CPU 118. The RAM 119 is used as a work area of the CPU 118. The RAM 119 is also used for storing temporary data.

The storage unit 120 is in charge of temporarily or permanently spooling and storing the print job data received from the image processing apparatus 102. In the present exemplary embodiment, the storage unit 120 is described as an HDD.

The reading unit 121 is a device for reading a paper document by an optical method. In the present exemplary embodiment, the reading unit 121 is described as a scanner. The scanner includes a document illumination lamp, a scanning mirror, a reflection mirror, a lens, and a solid image sensor. The scanner scans a document placed on a document positioning glass with light. Reflection light from the document is guided to the lens by the scanning mirror and the reflection mirror. An optical signal passed through the lens is guided to the solid image sensor. The solid image sensor converts the optical signal into an electrical signal, which is recognized as an image signal. The solid image sensor refers to, for example, a charge-coupled device (CCD) or a complementary metal oxide semiconductor (CMOS) image sensor.

The authentication unit 122 determines whether to permit print processing on the print job data received by the network I/F 117, by using the authentication information included in the print job data. More specifically, the authentication unit 122, under control of the print job data processing unit 127 to be described below, determines whether authentication information defined in the printing apparatus 103 in advance matches the authentication information included in the print job data. If they are determined to match each other, the print job data processing unit 127 continues the print processing based on the print job data. On the other hand, if they do not match each other, the print job data processing unit 127 aborts the print processing based on the print job data.

The image forming unit 123 performs a print process for forming an image by using raster data which is print image data, included in the print job data transmitted from the image processing apparatus 102. In the present exemplary embodiment, the image forming unit 123 is described as a printer engine. The image forming unit 123 forms an image based on the raster data generated by the RIP processing by the image processing unit 113 on a printing sheet to produce a print product. The image forming unit 123 can employ an electrophotographic method and use toner to form the image. The image forming unit 123 may form an image by using materials other than toner. For example, ink may be used.

The operation unit 124 is a user interface for operating and setting the printing system. In the present exemplary embodiment, the operation unit 124 is described as a device using a liquid crystal display (LCD) touch panel method.

The sheet feeding unit 125 stores printing sheets to be used in the MFP. The sheet feeding unit 125 is also called a sheet cassette, a sheet drawer, or a sheet deck. The MFP typically includes a plurality of sheet feeding units 125. From which of the plurality of sheet cassettes a printing sheet is fed depends on the print attributes (attributes about the sheet and the sheet cassette) included in the print job data, and the settings and state of the MFP. The print job data processing unit 127 to be described below determines from which of the plurality of sheet cassettes a printing sheet is fed. The fed printing sheet is eventually conveyed to the image forming unit 123, and the image forming unit 123 forms an image on the printing sheet to produce a print product.

According to the print attributes included in the print job data, the sheet discharge unit 126 applies post-processing to the print product on which the image is formed by the image forming unit 123, and discharges the post-processed print product to outside the printing apparatus 103. In the present exemplary embodiment, the sheet discharge unit 126 is described as a finisher. The sheet discharge unit 126, represented by a finisher and a stacker, typically has post-processing functions such as a stapling function, a punching function, a folding function, and a book-binding function. The sheet discharge unit 126 further includes discharge destinations such as several stacking trays. The post-processing functions and the discharge destinations are determined according to the print attributes included in the print job data. The print job data processing unit 127 gives instructions about the post-processing functions and the discharge destinations, and performs post-processing control and discharge control. The print job data processing unit 127 performs processing including overall control of the printing apparatus 103 and control of processing of the print job data. In the present exemplary embodiment, the print job data processing unit 127 is described as an MFP controller.

The network 104 is a global or local network represented by the Internet or a LAN. The network 104 is a medium that mutually communicably connects the client computer 101 and the image processing apparatus 102. Network communication techniques represented by the TCP/IP method are used for the connection.

Like the network 104, the network 105 is a global or local network represented by the Internet or a LAN. The network 105 is a medium that mutually communicably connects the image processing apparatus 102 and the printing apparatus 103. Network communication techniques represented by the TCP/IP method are used for the connection.

In the present exemplary embodiment, the connection between the network I/Fs 111 and 117, and the communication method thereof are described as peer-to-peer.

In the present exemplary embodiment, the networks 104 and 105 are described to be configured as respective independent networks. However, the networks 104 and 105 may be configured as a single network including the client computer 101, the image processing apparatus 102, and the printing apparatus 103.

In the present exemplary embodiment, the image processing apparatus 102 and the printing apparatus 103 are described to be configured as respective independent apparatuses. However, the image processing apparatus 102 and the printing apparatus 103 may be configured as a single apparatus having the functions of both of the apparatuses.

Figure 2:
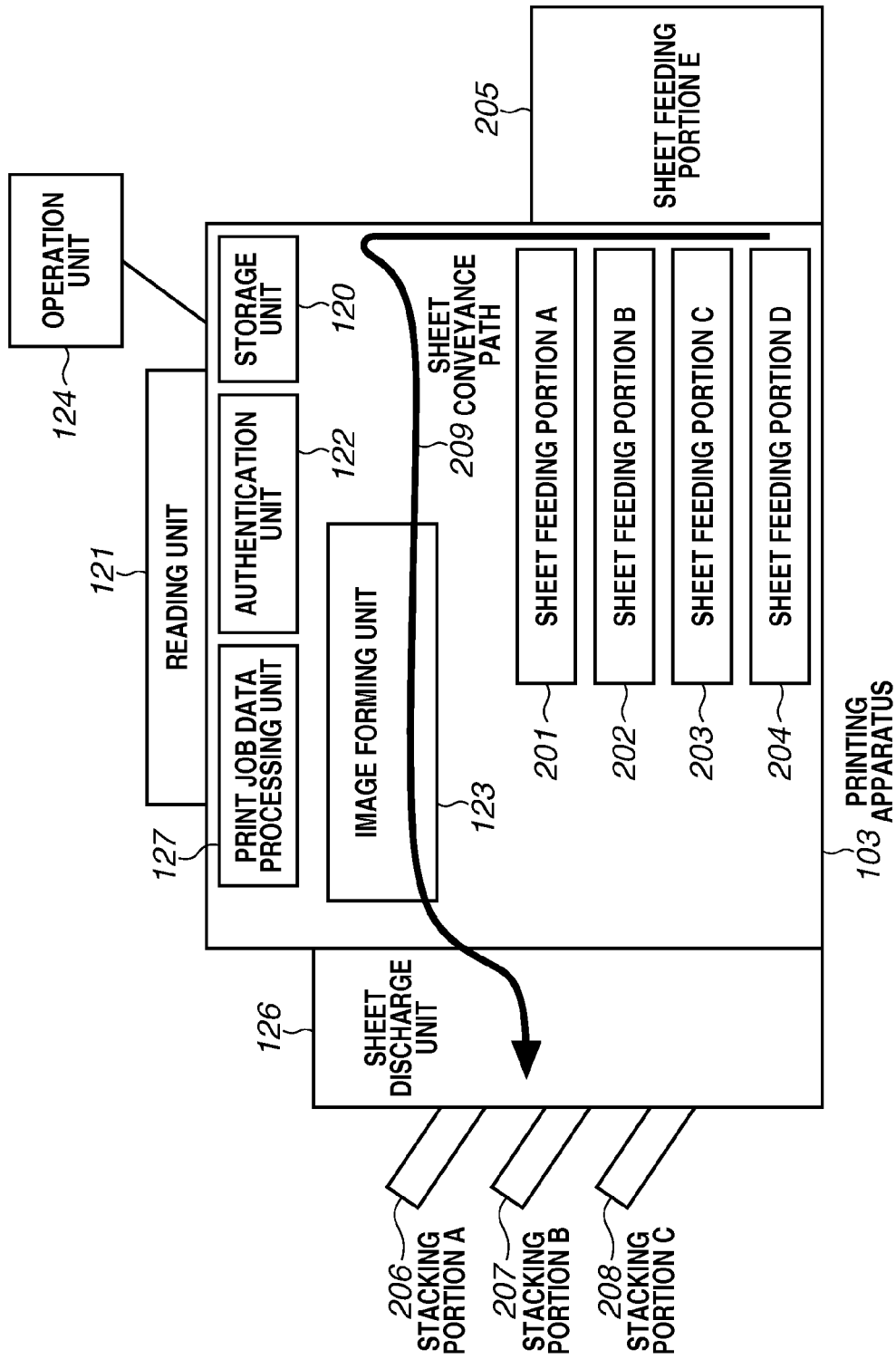
FIG. 2 is a block diagram illustrating a configuration of a printing apparatus.

FIG. 2 is a block diagram illustrating an example of a configuration of the printing apparatus 103.

As described above, the printing apparatus 103 includes the storage unit 120, the reading unit 121, the authentication unit 122, the print job data processing unit 127, the image forming unit 123, the operation unit 124, the sheet feeding unit 125, and the sheet discharge unit 126.

The sheet feeding unit 125 includes sheet feeding portions 201 to 205 (sheet feeding portions A to E). Specifically, the sheet feeding unit 125 includes a plurality of sheet cassettes or sheet decks intended for sheet feeding.

The sheet discharge unit 126 includes stacking units 206 to 208 (stacking units A to C). Specifically, the sheet discharge unit 126 includes a plurality of stacking trays intended for sheet discharging.

A sheet conveyance path 209 represents a conveyance path of a printing sheet. If a print job is successfully authenticated by the authentication unit 122, the print job data processing unit 127 starts print control. A printing sheet is then fed from any one of the sheet feeding portions 201 to 205. The printing sheet passes the image forming unit 123 to reach any one of the stacking portions 206 to 208.

Figure 3:
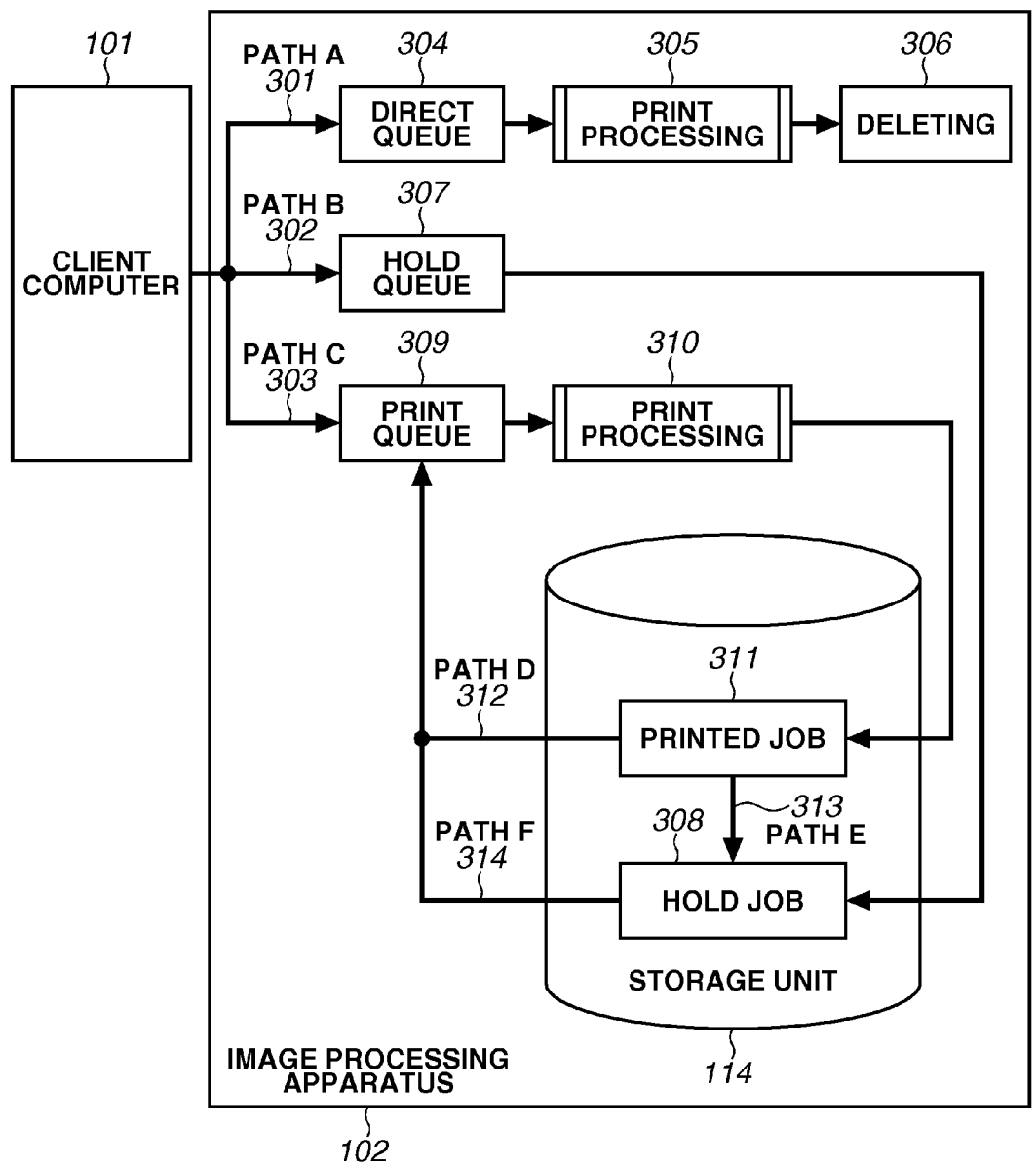
FIG. 3 is a block diagram illustrating paths of a print job and control of the print job in each path.

FIG. 3 is a diagram illustrating paths of a print job in the image processing apparatus 102 and an example of control of the print job in each path.

The image processing apparatus 102 includes three queues for a print job transmitted from the client computer 101. More specifically, the image processing apparatus 102 includes three paths 301, 302, and 303 (paths A, B, and C) according to the control of processing of the print job.

The image processing apparatus 102 can edit and re-execute a print job stored in the storage unit 114. To perform the editing and re-execution of a print job, the image processing apparatus 102 further includes three paths 312, 313, and 314 (paths D, E, and F) according to the control of processing of the print job. A print job stored in the storage unit 114 is classified into either one of two states, i.e., a printed job 311 and a hold job 308. The information about the print attributes included in a print job stored as a printed job 311 is not editable. On the other hand, the information about the print attributes included in a print job stored as a hold job 308 is editable.

The path 301 (path A) is a path of a print job if the print job is transmitted from the client computer 101 to a direct queue 304. The direct queue 304 refers to a queue where the image processing apparatus 102 receives a print job from the client computer 101, and if a series of processing on the print job is completed, deletes the print job. If the image processing apparatus 102 receives a print job from the client computer 101 by the direct queue 304 and completes a series of print processing 305 on the print job, the image processing apparatus 102 performs deleting 306 of the print job.

The deleting 306 refers to the deleting of data concerning the print job temporarily stored in the RAM 110 or the storage unit 114 (HDD) in the process of the series of print processing 305. The print processing 305 refers to a series of processing from the execution of the print job in the image processing apparatus 102 to the end of printing in the printing apparatus 103.

The path 302 (path B) refers to a path of a print job in a case where the print job is transmitted from the client computer 101 to a hold queue 307. The hold queue 307 refers to a queue in which a print job, which has been received by the image processing apparatus 102 from the client computer 101, is stored in the storage unit 114 as a hold job 308 without printing at least by the printing apparatus 103. The image processing apparatus 102 receives a print job from the client computer 101 by the hold queue 307, and stores the print job into the storage unit 114 as a hold job 308 without performing a series of print processing on the print job.

In another example related to the processing of the hold queue 307, the image processing apparatus 102 may perform the following processing. Specifically, the image processing apparatus 102 may perform image processing such as RIP processing by the image processing unit 113 and store, raster data serving as the print image data, and the print job into the storage unit 114 as a hold job 308.

The path 303 (path C) refers to a path of a print job in a case where the print job is transmitted from the client computer 101 to a print queue 309. The print queue 309 refers to a queue in which the print job is stored into the storage unit 114 as a printed job 311, which has been received by the image processing apparatus 102 from the client computer 101, and on which a series of processing has been completed. If the image processing apparatus 102 receives a print job from the client computer 101 by the print queue 309 and completes a series of print processing 310 on the print job, the image processing apparatus 102 stores the print job into the storage unit 114 as a printed job 311.

The print processing 310 refers to a series of processing from the execution of the print job in the image processing apparatus 102 to the end of printing in the printing apparatus 103. In the present exemplary embodiment, after the series of print processing on the print job is completed by the printing apparatus 103, the image processing apparatus 102 deletes the authentication information required for the determination of the authentication unit 122 among the information about the print attributes included in the print job. The image processing apparatus 102 then stores the print job from which the authentication information is deleted into the storage unit 114 as a printed job 311.

The path 312 (path D) refers to a path of a print job when the image processing apparatus 102 re-executes the print job stored in the storage unit 114 as a printed job 311. If the image processing apparatus 102 is instructed to re-execute the print job that is a printed job 311, the image processing apparatus 102 receives the print job by the print queue 309. The image processing apparatus 102 then performs the series of print processing 310 on the print job. When the print processing 310 is completed, the image processing apparatus 102 stores the print job into the storage unit 114 as a printed job 311 again. In such a case, the information about the print attributes included in the print job that is a printed job 311 is the information at the time point at which the print job is stored into the storage unit 114. Such a print job is simply re-executed. In a case where the information about the print attributes is changed and the print job is re-executed, the path 313 (path E) and the path 314 (path F) need to be taken.

The path 313 (path E) is a path of a print job when a state of the print job stored as a printed job 311 in the storage unit 114 is shifted to a state of a hold job 308. If the image processing apparatus 102 is instructed to shift the print job that is a printed job 311 to a hold job 308, the image processing apparatus 102 stores the print job into the storage unit 114 again as a hold job 308. The information about the print attributes included in the print job becomes changeable only after the print job is stored as a hold job 308.

The path 314 (path F) is a path of a print job when the image processing apparatus 102 re-executes the print job stored in the storage unit 114 as a hold job 308. If the image processing apparatus 102 is instructed to re-execute the print job that is a hold job 308, the image processing apparatus 102 receives the print job by the print queue 309. The image processing apparatus 102 then performs the series of print processing 310 on the print job. If the print processing 310 is completed, the image processing apparatus 102 stores the print job into the storage unit 114 again as a printed job 311. If the information about the print attributes included in the print job stored as a hold job 308 is changed before the re-execution of the print job, the series of print processing 310 is applied based on the changed information about the print attributes.

Figure 4:
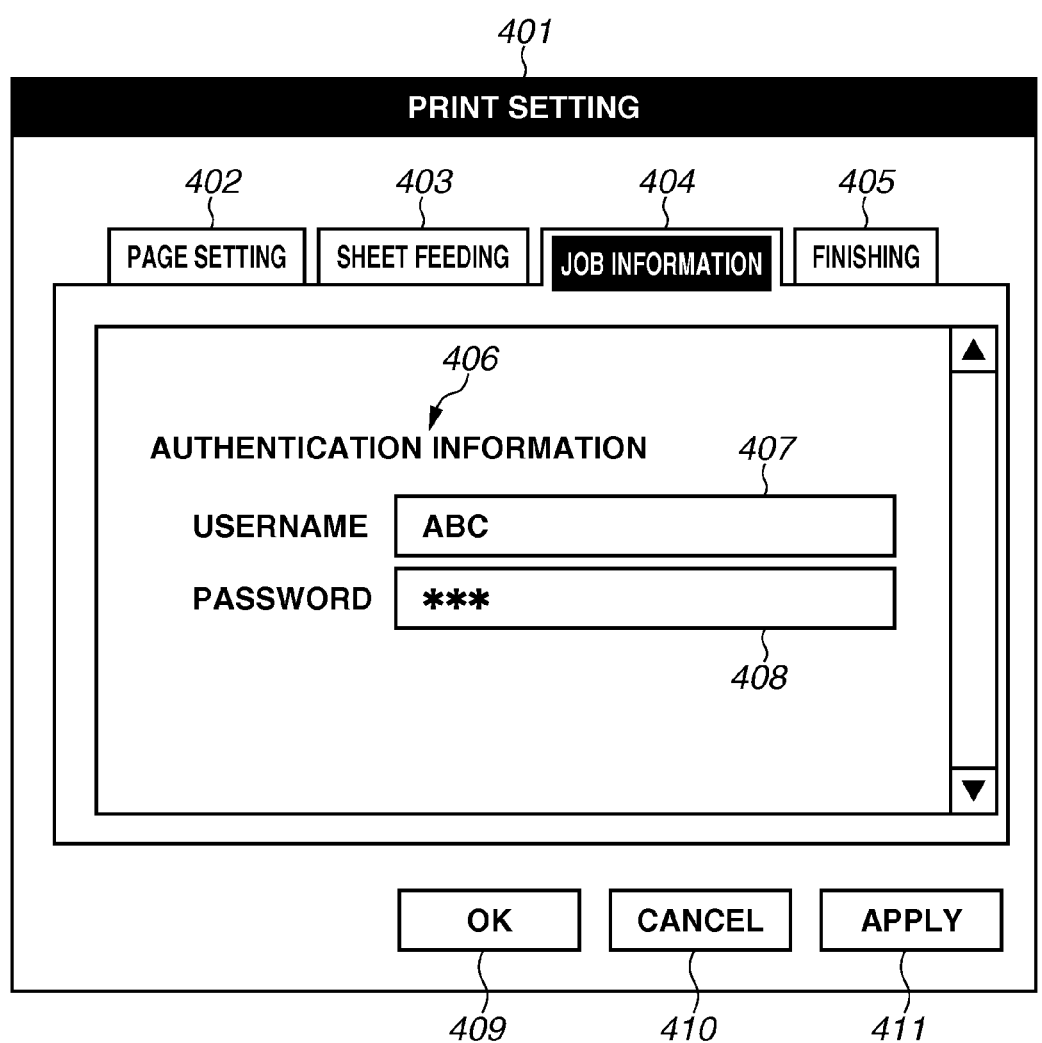
FIG. 4 is a diagram illustrating a first example of a method for setting print attributes.

FIG. 4 is a diagram illustrating an example of a method (print setting method) for setting the print attributes included in a print job.

A print setting screen 401 is displayed, for example, when the information about the print attributes of a print job is set with the printer driver 106 of the client computer 101. The print setting screen 401 is also displayed when the information about the print attributes of a print job that is stored as a hold job 308 is changed. For example, at the time of such a change, the client computer 101 accesses the image processing apparatus 102 via the network 104 by using dedicated utility software or a browser, whereby the print setting screen 401 is displayed.

The print setting screen 401 includes a plurality of setting screens which is categorized into a page setting group 402, a sheet feeding group 403, a job information group 404, and a finishing group 405. The print setting screen 401 is a user interface (UI) for setting (print settings) various types of information about the print attributes of a print job. If the user presses respective areas on the graphic user interface (GUI), the print setting screen 401 shifts to respective setting screens. FIG. 4 illustrates a state where the setting screen of the job information group 404 is displayed. The print setting screen 401 further includes an OK button 409, a cancel button 410, and an apply button 411.

The page setting group 402 is a UI for making print settings related to page settings among the information about the print attributes included in the print job. Examples of the print settings related to the page settings include various specifications such as a page size of a print document, a size of an output sheet, a page layout thereof, and scaling.

The sheet feeding group 403 is a UI for making print settings related to sheet feeding among the information about the print attribute included in the print job. Examples of the print settings related to the sheet feeding include various specifications such as a sheet cassette, a sheet type, insertion sheets, and front and back covers.

The job information group 404 is a UI for making print settings related to job information among the information about the print attributes included in the print job. Examples of the print settings about the job information include various specifications such as the number of copies and authentication information. In the present exemplary embodiment, the authentication information will be described in detail. The setting screen of the job information group 404 displays at least an authentication information setting 406, a username input area 407, and a password input area 408.

The authentication information setting 406 is a UI for setting the authentication information required for the determination of the authentication unit 122 among the information about the print attributes included in the print job. The present exemplary embodiment will be described by taking an example where the authentication information required for the determination of the authentication unit 122 includes a username with which the print job is executed in the printing system, and a password of the user who has the username.

The username input area 407 is a UI for inputting the username with which the print job is executed in the printing system among the authentication information required for the determination of the authentication unit 122.

The password input area 408 is a UI for inputting the password to be paired with the username with which the print job is executed in the printing system among the authentication information required for the determination of the authentication unit 122.

The authentication information input to the username input area 407 and the password input area 408 is processed by the image processing apparatus 102 as part of the information about the print attributes included in the print job. The authentication information is then used for authentication processing by the authentication unit 122 as part of the print job data. The print processing of the print job data is continued only if authentication information defined in the printing apparatus 103 in advance matches the authentication information included in the print job data (i.e., the authentication information input to the username input area 407 and the password input area 408).

The finishing group 405 is a UI for making print settings related to page settings among the information about the print attributes included in the print job. Examples of the print settings related to the page settings include various specifications such as two-sided printing, a binding direction, stapling, punching, folding, and a discharge tray.

The OK button 409 is a UI for storing the information input to the print setting screen 401. If the area corresponding to the OK button 409 on the GUI is pressed, the information input to the print setting screen 401 is stored and the print setting screen 401 is closed.

The cancel button 410 is a UI for cancelling the information input to the print setting screen 401. If the area corresponding to the cancel button 410 on the GUI is pressed, the information input to the print setting screen 401 is discarded and the print setting screen 401 is closed.

The apply button 411 is a UI for storing the information input to the print setting screen 401 while the settings on the print setting screen 401 is continued being made. If the area corresponding to the apply button 411 on the GUI is pressed, the information input to the print setting screen 401 is stored. In such a case, the print setting screen 401 continues being displayed.

Figure 5:
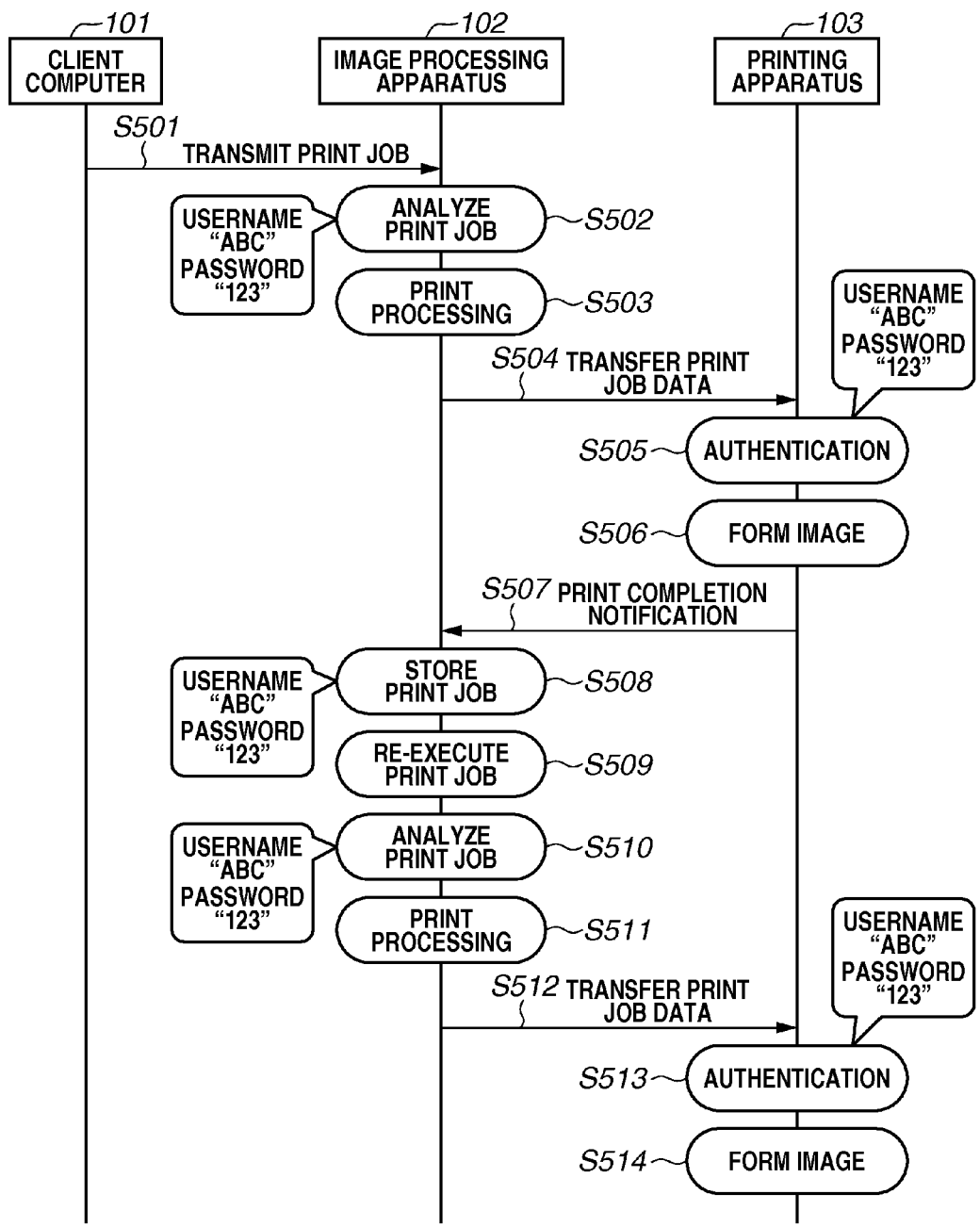
FIG. 5 is a diagram illustrating a first example of processing of the printing system.

FIG. 5 is a diagram illustrating an example of processing of the printing system when a print job is re-executed. FIG. 5 is an example for the comparison with the processing according to the present exemplary embodiment. FIG. 5 illustrates processing sequences of the client computer 101, the image processing apparatus 102, and the printing apparatus 103. In FIG. 5, the time progresses downward from the top.

First, in step S501, the image processing apparatus 102 receives a print job transmitted from the client computer 101.

In step S502, the image processing apparatus 102 analyzes the print job received in step S501.

In the following description, it is assumed that a username "ABC" and a password "123" are obtained by the analysis of the print job as authentication information that is one of the pieces of information about the print attributes included in the print job. For example, the username and the password are authentication information input from the username input area 407 and the password input area 408 of the authentication information setting 406 of the print setting screen 401. In the following description, it is also assumed that the path 303 (path C) is selected as the path of the print job received in step S501, and the print job is processed by the print queue 309.

In step S503, the image processing apparatus 102 applies image processing to the print job to obtain print image data.

In step S504, the image processing apparatus 102 transfers the information about the print attributes including the authentication information obtained in step S502 and the print image data obtained in step S503 to the printing apparatus 103 as print job data.

In step S505, the printing apparatus 103 determines whether to perform the print processing of the print job data, by using the authentication information among the information about the print attributes included in the print job data. More specifically, if authentication information defined in the printing apparatus 103 in advance matches the authentication information included in the print job data, the printing apparatus 103 continues the print processing. On the other hand, if the authentication information defined in the printing apparatus 103 in advance does not match the authentication information included in the print job data, the printing apparatus 103 aborts the print processing. The authentication information included in the print job data is the username "ABC" and the password "123" obtained in step S502.

In step S505, if the pieces of authentication information match each other and the print processing of the print job data is determined to be performed, then in step S506, the printing apparatus 103 forms an image by using the print job data to obtain a print product.

In step S507, the image processing apparatus 102 receives a print completion notification from the printing apparatus 103, thereby recognizing the completion of the series of print processing in the printing apparatus 103.

In step S508, the image processing apparatus 102 stores the print job received in step S501 into the storage unit 114, and ends the series of processing of the print job through the path 303 (path C). When the print job is stored into the storage unit 114, the image processing apparatus 102 also stores all the information about the print attributes included in the print job. More specifically, the username "ABC" and the password "123" serving as the authentication information are also stored in the storage unit 114. Since the print job is processed through the path 303 (path C), the print job is stored into the storage unit 114 as a printed job 311.

After the end of the series of processing of the print job in step S508, the user gives an instruction to re-execute the print job stored in the storage unit 114 as a printed job 311. In step S509, the image processing apparatus 102 performs processing through the path 312 (path D).

In step S510, the image processing apparatus 102 analyzes the print job. By the analysis of the print job, the image processing apparatus 102 obtains the username "ABC" and the password "123" as the authentication information that is one of the pieces of information about the print attributes included in the print job. As described above, in step S508, the image processing apparatus 102 stores all the information about the print attributes included in the print job (the username "ABC" and the password "123" serving as the authentication information) when storing the print job into the storage unit 114. Therefore, in step S510, exactly the same authentication information as that stored in step S508 is obtained. Since the image processing apparatus 102 performs processing through the path 312 (path D), the print job is processed by the print queue 309.

In step S511, the image processing apparatus 102 applies the image processing to the print job to obtain print image data.

In step S512, the image processing apparatus 102 transfers the information about the print attributes including the authentication information obtained in step S510 and the print image data obtained in step S511 to the printing apparatus 103 as print job data.

In step S513, the printing apparatus 103 determines whether to perform the print processing of the print job data, by using the authentication information among the information about the print attributes included in the print job data. The authentication information included in the print job data is the username "ABC" and the password "123" obtained in step S510. If the authentication information defined in the printing apparatus 103 in advance and the authentication information included in the print job data are determined to match, the printing apparatus 103 continues the print processing. On the other hand, if the authentication information defined in the printing apparatus 103 in advance does not match the authentication information included in the print job data, the printing apparatus 103 aborts the print processing.

In step S513, if the pieces of authentication information match each other and the print processing of the print job data is determined to be performed, then in step S514, the printing apparatus 103 forms an image by using the print job data to obtain a print product.

As described above, in step S508, the username "ABC" and the password "123" are stored as the authentication information. If the print job stored in the storage unit 114 as a printed job 311 is re-executed in step S509, the authentication information matches again in step S513 and the print processing of the print job data is continued. However, if the authentication information included in the print job re-executed in step S509 is different from the authentication information about the user who re-executes the print job, the authentication in step S513 will not be performed properly. Thus, the printing apparatus 103 fails to properly perform authentication based on the authentication information about the user who actually gives an instruction to execute the print job, and various types of counting related to printing. Such a mismatch of the authentication information can reduce the reliability and security of the authentication function of the printing system.

Figure 6:
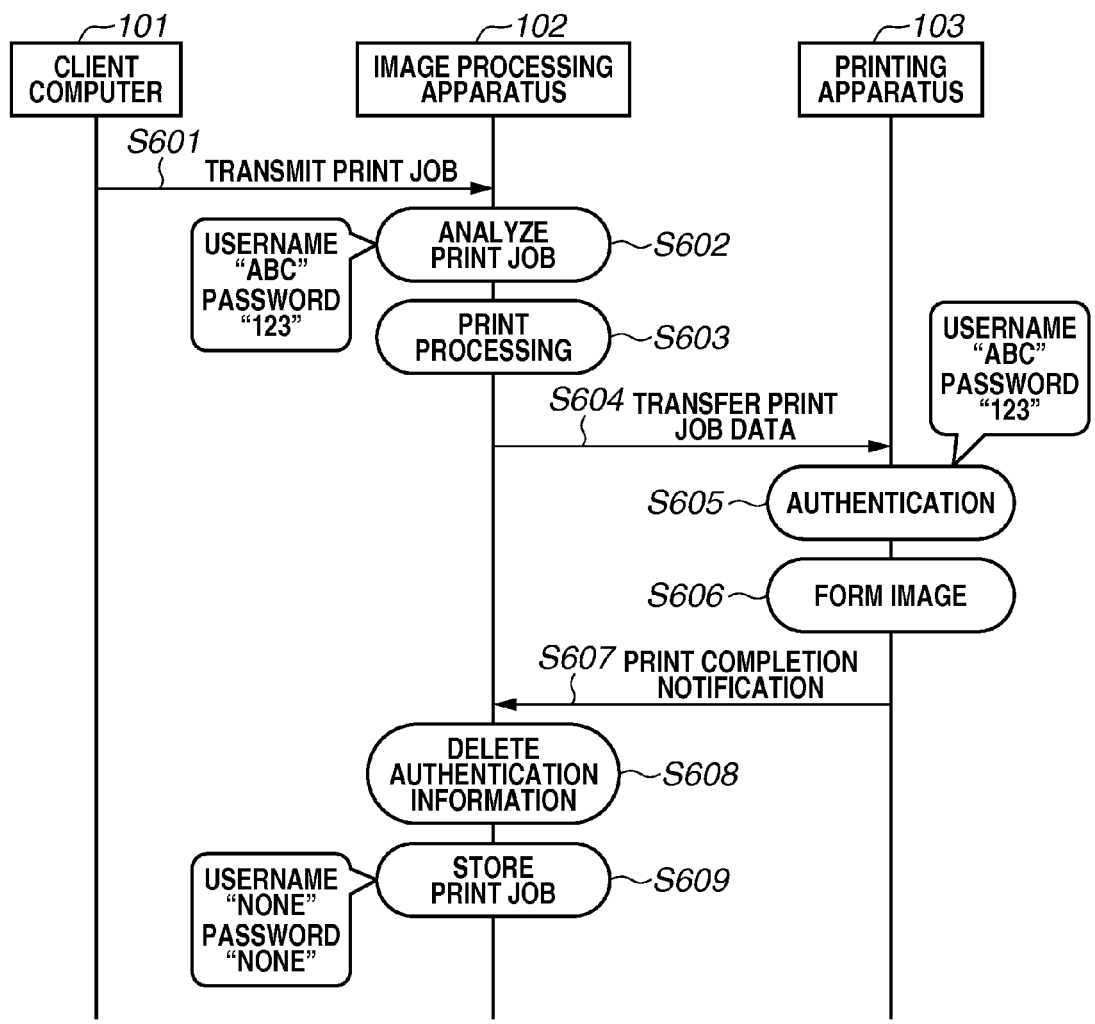
FIG. 6 is a diagram illustrating a second example of the processing of the printing system.

FIG. 6 is a diagram illustrating an example of processing of the printing system when a print job is executed. FIG. 6 is intended to describe an example of processing according to the present exemplary embodiment (as described above, FIG. 5 is an example for the comparison with the processing according to the present exemplary embodiment). Like FIG. 5, FIG. 6 illustrates the processing sequences of the client computer 101, the image processing apparatus 102, and the printing apparatus 103. In FIG. 6, like in FIG. 5, the time progresses downward from the top.

In step S601, the image processing apparatus 102 receives a print job transmitted from the client computer 101.

In step S602, the image processing apparatus 102 analyzes the print job received in step S601.

In the following description, similar to step S502 of FIG. 5, it is assumed that a username "ABC" and a password "123" are obtained as the authentication information that is one of the pieces of information about the print attributes included in the print job. For example, the username and the password are authentication information input to the username input area 407 and the password input area 408 of the authentication information setting 406 of the print setting screen 401. It is also assumed that the path 303 (path C) is selected and the print job received in step S601 is processed by the print queue 309.

In step S603, the image processing apparatus 102 applies the image processing to the print job to obtain print image data.

In step S604, the image processing apparatus 102 transfers the information about the print attributes including the authentication information obtained in step S602 and the print image data obtained in step S603 to the printing apparatus 103 as print job data.

In step S605, the printing apparatus 103 determines whether to perform the print processing of the print job data, by using the authentication information (the username "ABC" and the password "123" obtained in step S602) among the information about the print attributes included in the print job data. If authentication information defined in the printing apparatus 103 in advance and the authentication information included in the print job data are determined to match, the printing apparatus 103 continues the print processing. On the other hand, if the authentication information defined in the printing apparatus 103 in advance does not match the authentication information included in the print job data, the printing apparatus 103 aborts the print processing.

In step S605, if the pieces of authentication information match each other and the print processing of the print job data is determined to be performed, then in step S606, the printing apparatus 103 forms an image by using the print job data to obtain a print product.

In step S607, the image processing apparatus 102 receives a print completion notification from the printing apparatus 103, thereby recognizing the completion of the series of print processing in the printing apparatus 103.

In such a manner, the image processing apparatus 102 determines that the series of print processing is completed by the print completion notification obtained in step S607. In the present exemplary embodiment, after the determination, in step S608, the image processing apparatus 102 deletes the authentication information that is one of the pieces of information about the print attributes included in the print job received in step S601. More specifically, the image processing apparatus 102 deletes both the pieces of authentication information, i.e., the username "ABC" which is one of the pieces of authentication information and the password "123" which is the other piece of authentication information.

In step S609, the image processing apparatus 102 stores the print job from which the authentication information is deleted in step S608 into the storage unit 114, and ends the series of processing of the print job through the path 303 (path C).

The print job is stored into the storage unit 114 as a printed job 311 through the path 303 (path C). In the authentication information that is one of the pieces of information about the print attributes included in such a print job, no setting is made. To re-execute the print job stored in the storage unit 114 as a printed job 311 afterward, at least predetermined authentication information needs to be set by the user who actually executes the print job. This prevents printing resulting from a mismatch of the authentication information as described with reference to FIG. 5.

Examples of a method for setting new authentication information for a print job that is stored in the storage unit 114 as a printed job 311 in the foregoing manner (print job including no authentication information) will be described below.

In a first method, if the image processing apparatus 102 is instructed to perform processing through the path 313 (path E), the image processing apparatus 102 changes the printed job 311 into a hold job 308. Then, if the user inputs authentication information to the username input area 407 and the password input area 408 of the print setting screen 401 and presses the OK button 409 or the apply button 411, the image processing apparatus 102 adds the authentication information into the hold job 308.

In a second method, if the image processing apparatus 102 is instructed to re-execute the printed job 311, the image processing apparatus 102 performs processing through the path 312 (path D). More specifically, the image processing apparatus 102 inputs the printed job 311 into the print queue 309. Then, if the user inputs authentication information to the username input area 407 and the password input area 408 of the print setting screen 401 and presses the OK button 409 or the apply button 411, the image processing apparatus 102 obtains the authentication information. The image processing apparatus 102 adds the obtained authentication information into the printed job 311 input to the print queue 309 when the printed job 311 is processed.

In another example, login information of the printing system about the user who gives an instruction to perform the foregoing processing or information stored in the printing system in advance may be set as the new authentication information.

Figure 7:
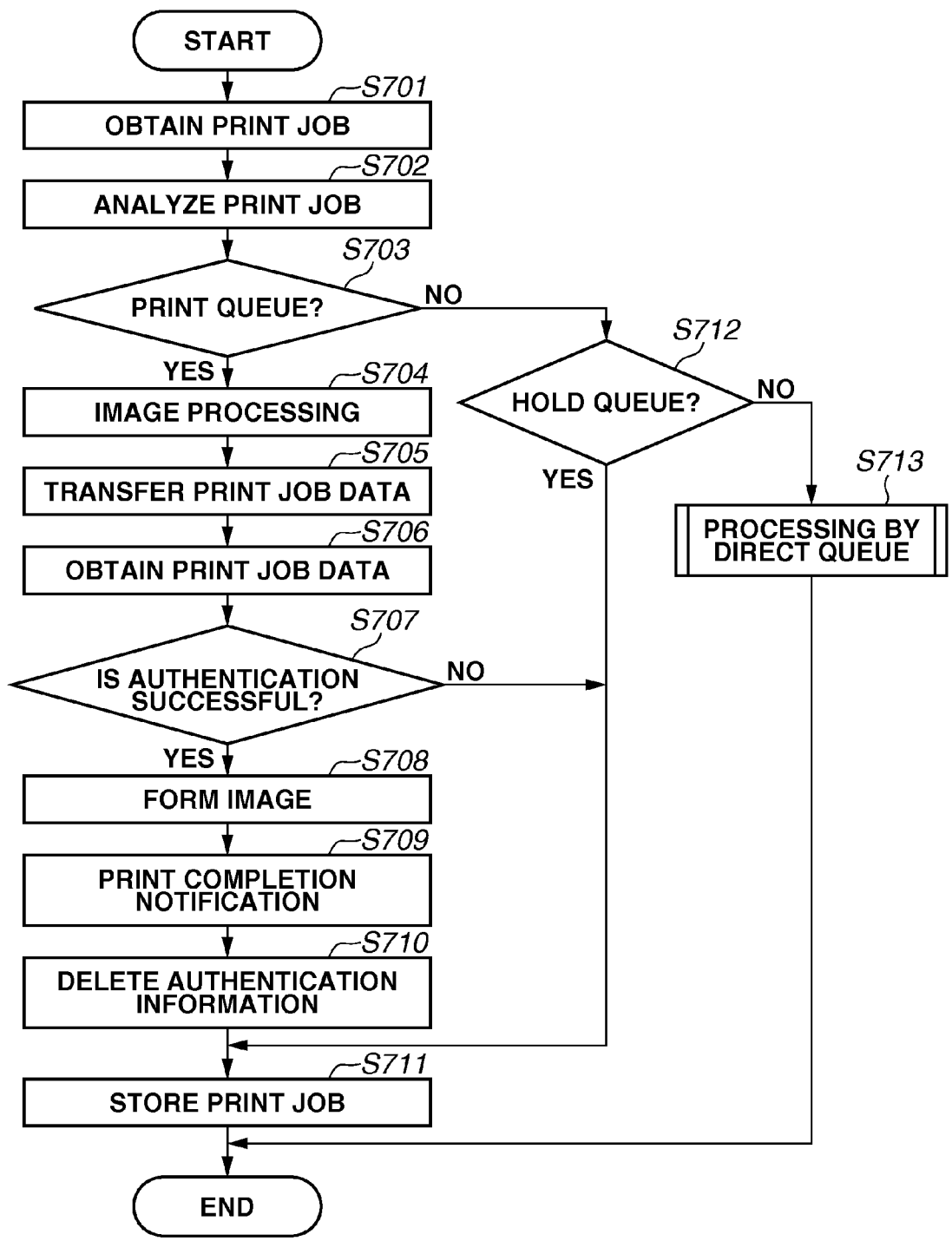
FIG. 7 is a flowchart illustrating the first example of the processing of the printing system.

FIG. 7 is a flowchart illustrating an example of processing of the printing system when a print job transmitted from the client computer 101 is processed. This flowchart is implemented by the processing of the following hardware. In the image processing apparatus 102, the print job processing unit 115 performs processing to implement the flowchart according to a program stored in the storage unit 114. In the printing apparatus 103, the print job data processing unit 127 performs processing to implement the flowchart according to a program stored in the storage unit 120.

In step S701, the print job processing unit 115 initially obtains a print job transmitted from the client computer 101. The processing of the printing system starts when the print job is obtained. The print job processing unit 115 temporarily spools the obtained print job in the storage unit 114.

In step S702, the print job processing unit 115 analyzes the print job obtained in step S701 to obtain print image information and print attribute information. As described above, the print image information is drawing data described in the PDL. The print attribute information (information about print attributes) includes information about the type of the path to process the print job and information about various print settings such as page settings, sheet feeding, job information, and finishing. The print attribution information further includes authentication information.

In step S703, the print job processing unit 115 determines whether the type of the path of the print job obtained in step S702 is the print queue 309 (path 303 (path C)).

If the type of the path of the print job is determined not to be the print queue 309 (NO in step S703), the processing proceeds to step S712.

On the other hand, if the type of the path of the print job is the print queue 309 (YES in step S703), the processing proceeds to step S704. In step S704, the print job processing unit 115 instructs the image processing unit 113 to apply image processing to the drawing data included in the print job. As a result, the image processing unit 113 performs the image processing. Then, in step S704, the print job processing unit 115 obtains print image data from the image processing unit 113.

In step S705, the print job processing unit 115 transfers the print attribute information including the authentication information obtained in step S702 and the print image data obtained in step S704 to the printing apparatus 103 as print job data.

In step S706, the print job data processing unit 127 obtains the print job data transferred from the image processing apparatus 102.

In step S707, the print job data processing unit 127 instructs the authentication unit 122 to perform authentication on the print job data obtained in step S706. If authentication information defined in the printing apparatus 103 in advance matches the authentication information included in the print job data obtained in step S706, the authentication unit 122 determines that the authentication is successful. If not, the authentication unit 122 determines that the authentication is failed. In step S707, based on the result of the authentication by the authentication unit 122, the print job data processing unit 127 determines whether to perform the print processing of the print job data obtained in step S706 (whether the authentication is successful).

If the print processing of the print job data is determined not to be performed (i.e., the authentication is failed) (NO in step S707), the processing proceeds to step S711 to be described below, skipping steps S708 to S710.

On the other hand, if the print processing of the print job data is performed (i.e., the authentication is successful) (YES in step S707), the processing proceeds to step S708. In step S708, the print job data processing unit 127 instructs the image forming unit 123 to form an image based on the print image data. As a result, the image forming unit 123 forms an image based on the print image data obtained in step S706 to obtain a print product.

In step S709, the print job data processing unit 127 issues a print completion notification to the image processing apparatus 102. The print job processing unit 115 receives the print completion notification from the printing apparatus 103.

In step S710, the print job processing unit 115 determines that the series of print processing is completed based on the print completion notification obtained in step S709. Then, the print job processing unit 115 deletes the authentication information that is one of the pieces of print attribute information included in the print job.

In step S711, the print job processing unit 115 stores the print job into the storage unit 114, and ends the processing of the printing system.

As described above, in step S703, if the type of the path of the print job obtained in step S702 is determined not to be the print queue 309 (path 303 (path C)) (NO in step S703), the processing proceeds to step S712. In step S712, the print job processing unit 115 determines whether the type of the path of the print job obtained in step S702 is the hold queue 307 (path 302 (path B)).

If the type of the path of the print job is determined to be the hold queue 307 (YES in step S712), the processing proceeds to the foregoing step S711. In such a manner, according to the present exemplary embodiment, if the type of the path of the print job is the hold queue 307, the print job processing unit 115 does not delete but stores the authentication information included in the print job.

On the other hand, if the type of the path of the print job is not the hold queue 307, the type of the path of the print job is the direct queue 304 (path 301 (path A)). In such a case (NO in step S712), the processing proceeds to step S713. In step S713, the print job processing unit 115 performs the processing through the path 301 (path A) (processing by the direct queue 304) as described with reference to FIG. 3, and ends the processing of the printing system.

As described above, in the present exemplary embodiment, when a print job to be re-executed is stored, the print job processing unit 115 deletes the authentication information (user information) required for the authentication function in the printing system among the print attributes included in the print job. The print job processing unit 115 then stores the print job in the printing system. This can suppress, for example, a difference between the user who gives an instruction to re-execute the print job and the user who performs authentication in the printing system. The printing system can thus properly perform authentication based on the user information about the user who actually executes the print job, and various types of counting related to printing. Consequently, according to the present exemplary embodiment, a printing system that has the function of storing a print job and improves the reliability and security of the authentication function can be achieved.

Next, a second exemplary embodiment will be described in detail.

The first exemplary embodiment has been described by taking an example in which the authentication information required for the authentication function in the printing system among the print attributes included in a print job is always deleted when the print job is stored in the printing system after completing a series of print processing of the print job. However, the usage of the printing system, or a printing workflow, varies depending on a printing environment in the printing system. More specifically, there may be a need not to delete the authentication information required for the authentication in the printing system among the print attributes included in a print job when the print job is stored in the printing system.

In the present exemplary embodiment, a case is described in which if there is a print attribute that is set to leave the authentication information included in the print job after the completion of the series of print processing, the authentication information is left undeleted when the print job is stored in the printing system.

As described above, in the present exemplary embodiment, to improve convenience, a configuration and processing for adapting to various printing workflows of the printing system are added to the configuration and processing according to the first exemplary embodiment. More specifically, in the present exemplary embodiment, a configuration and processing for, when a print job to be re-executed is stored, leaving the authentication information included in the print job based the user's setting are added to the first exemplary embodiment. In the description of the present exemplary embodiment, similar parts to those of the first exemplary embodiment are thus designated by the same reference numerals as those used in FIGS. 1 to 7. A detailed description thereof will be omitted.

Figure 8:
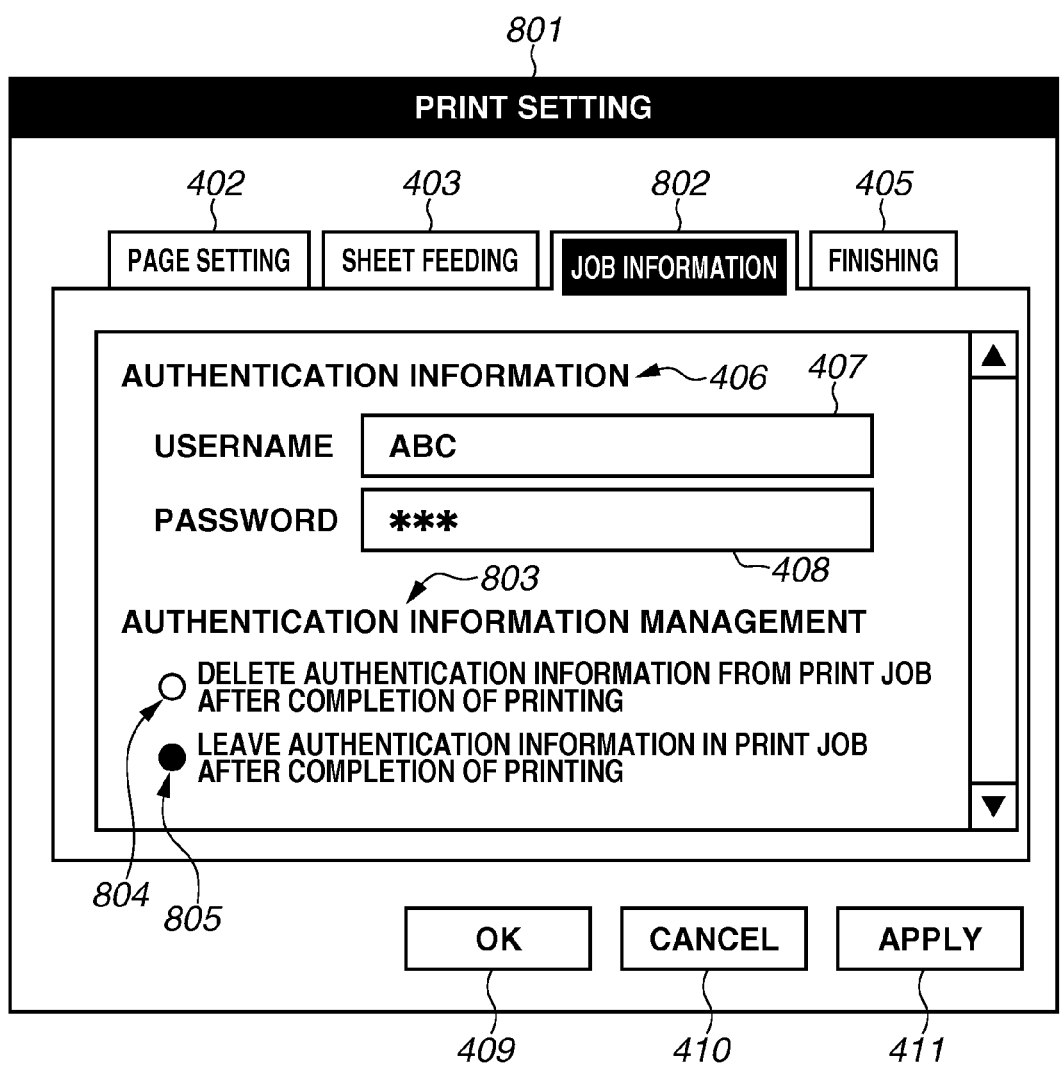
FIG. 8 is a diagram illustrating a second example of the method for setting print attributes.

FIG. 8 is a diagram illustrating an example of a method (print setting method) for setting the print attributes included in a print job. FIG. 8 corresponds to FIG. 4.

A print setting screen 801 differs from the print setting screen 401 described in the first exemplary embodiment only in part of the setting screen of a job information group 802. The timing to display the print setting screen 801 is similar to the timing to display the print setting screen 401 described in the first exemplary embodiment.

The print setting screen 801 includes a plurality of setting screens which is categorized into a page setting group 402, a sheet feeding group 403, the job information group 802, and a finishing group 405. The print setting screen 801 is a UI for making settings (print settings) of various types of information about the print attributes related to a print job. If the user presses respective areas on the GUI, the print setting screen 801 shifts to respective setting screens.

The job information group 802 is a UI for making print settings related to the job information among the information about the print attributes included in the print job. Examples of the print settings related to the job information include various specifications such as the number of copies and authentication information. Like the first exemplary embodiment, in the present exemplary embodiment, the authentication information is described in detail.

The setting screen of the job information group 802 displays at least an authentication information setting 406, a username input area 407, a password input area 408, an authentication information management setting 803, an authentication information management option 804, and an authentication information management option 805. The authentication information setting 406, the username input area 407, and the password input area 408 are similar to those described in the first exemplary embodiment, respectively.

The authentication information management setting 803 is a UI for selecting whether to leave the authentication information included in the print job after the completion of a series of print processing. The authentication information management option 804 is an option for making a setting to delete the authentication information from the print job after the completion of the print processing. The authentication information management option 805 is an option for making a setting to leave the authentication information in the print job after the completion of the print processing. If the user presses either one of areas on the GUIs of the authentication information management options 804 and 805, whether to leave the authentication information in the print job is selected.

The print job includes setting information indicating the selection result of the authentication information management option 804 or 805. The setting information is interpreted by the image processing apparatus 102 and processed in any of the foregoing operations. More specifically, if the authentication information management option 804 is selected, the image processing apparatus 102, after the completion of the series of image processing, deletes the authentication information that is one of the pieces of information about the print attributes included in the print job. The image processing apparatus 102 then stores the print job into the storage unit 114. This leads to the same result as in the first exemplary embodiment. On the other hand, if the authentication information management option 805 is selected, the image processing apparatus 102, after the completion of the series of print processing, leaves the authentication information that is one of the pieces of print attribute information included in the print job. The image processing apparatus 102 then stores the print job into the storage unit 114.

Figure 9:
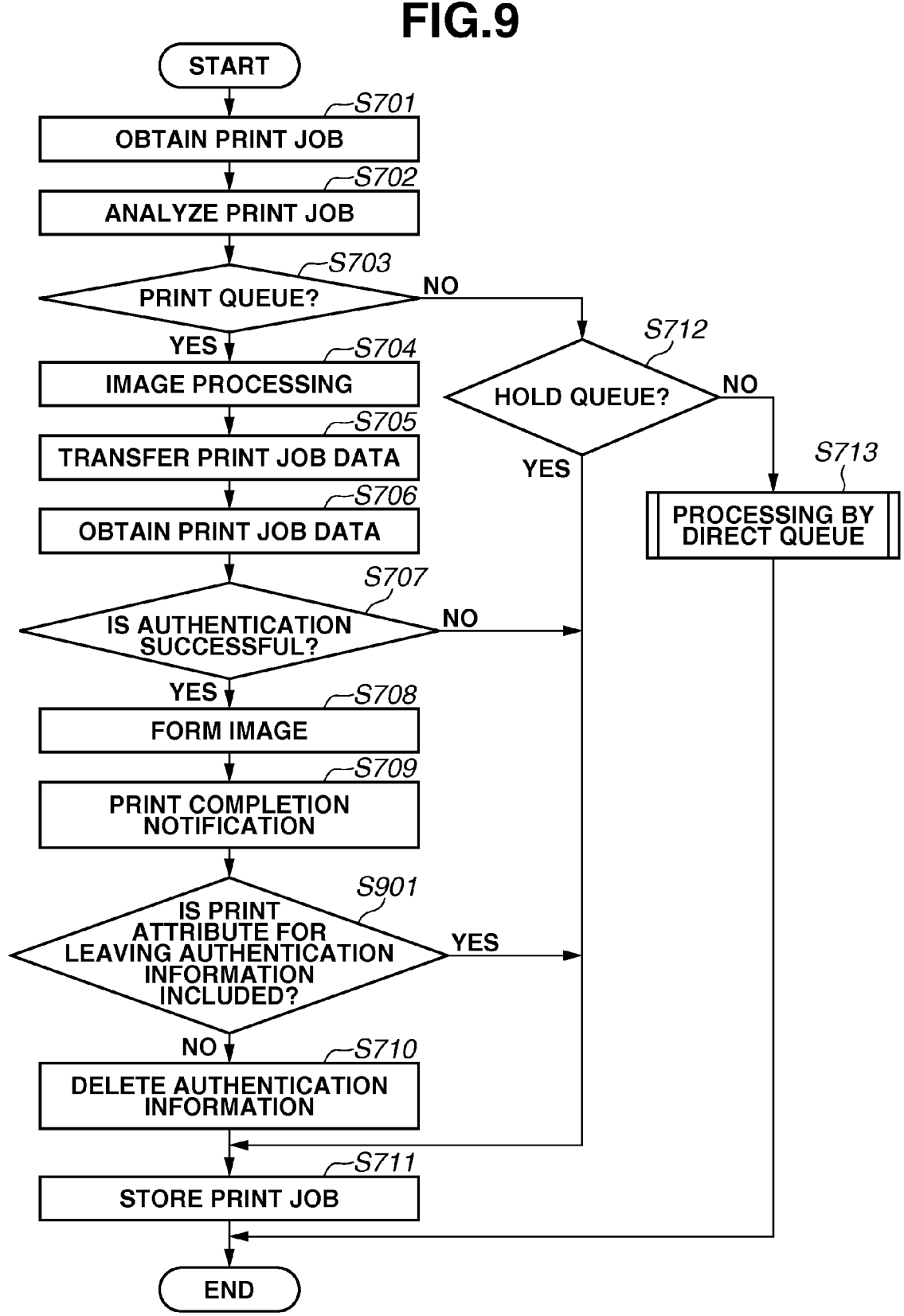
FIG. 9 is a flowchart illustrating the second example of the processing of the printing system.

FIG. 9 is a flowchart illustrating an example of the processing of the printing system when a print job transmitted from the client computer 101 is processed. FIG. 9 corresponds to FIG. 7. The flowchart of FIG. 9 is obtained by adding the processing of step S901 to between steps S709 and S710 in the flowchart of FIG. 7. The hardware for implementing the flowchart of FIG. 9 is the same as that for implementing the flowchart of FIG. 7.

In step S701, the print job processing unit 115 obtains a print job transmitted from the client computer 101, and temporarily spools the print job in the storage unit 114.

In step S702, the print job processing unit 115 analyzes the print job obtained in step S701 to obtain print image information and print attribute information.

In step S703, the print job processing unit 115 determines whether the type of the path of the print job obtained in step S702 is the print queue 309 (path 303 (path C)).

If the type of the path of the print job is determined not to be the print queue 309 (NO in step S703), the processing proceeds to step S712. In step S712, the print job processing unit 115 determines whether the type of the path of the print job obtained in step S702 is the hold queue 307 (path 302 (path B)). If the type of the path of the print job is determined to be the hold queue 307 (YES in step S712), the processing proceeds to step S711. If not (NO in step S712), the processing proceeds to step S713. In step S713, the print job processing unit 115 performs processing through the path 301 (path A) (processing by the direct queue 304).

In step S703, if the type of the path of the print job is determined to be the print queue 309 (YES in step S703), the processing proceeds to step S704. In step S704, the print job processing unit 115 instructs the image processing unit 113 to perform the image processing, and obtains print image data generated by the image processing unit 113 based on the instruction.

In step S705, the print job processing unit 115 transfers the print attribute information including the authentication information obtained in step S702 and the print image data obtained in step S704 to the printing apparatus 103 as print job data.

In step S706, the print job data processing unit 127 obtains the print job data transferred from the image processing apparatus 102.

In step S707, the print job data processing unit 127 instructs the authentication unit 122 to perform authentication. The print job data processing unit 127 determines whether to perform the print processing of the print job data obtained in step S706 (whether the authentication is successful) from the result of the authentication performed by the authentication unit 122 based on the instruction.

If the print processing of the print job data is determined not to be performed (the authentication is failed) (NO in step S707), the processing proceeds to step S711 to be described below, skipping steps S708 to S710.

On the other hand, if the print processing of the print job data is performed (the authentication is successful) (YES in step S707), the processing proceeds to step S708. In step S708, the print job data processing unit 127 instructs the image forming unit 123 to form an image. Based on the instruction, the image forming unit 123 forms an image based on the print image data obtained in step S706 to obtain a print product.

In step S709, the print job data processing unit 127 issues a print completion notification to the image processing apparatus 102. The print job processing unit 115 receives the print completion notification from the printing apparatus 103.

In step S901, the print job processing unit 115 determines whether the print attribute indicating to leave the authentication information required for the determination of the authentication unit 122 is included in the print attribute information obtained in step S702.

If the print attribute indicating to leave the authentication information is determined to be included in the print attribute information (YES in step S901), the processing proceeds to step S711, skipping step S710.

On the other hand, if the print attribute indicating to leave the authentication information is not included in the print attribute information (NO in step S901), the processing proceeds to step S710.

In step S710, the print job processing unit 115 determines that the series of print processing is completed from the print completion notification obtained in step S709. The print job processing unit 115 deletes the authentication information that is one of the pieces of print attribute information included in the print job.

In step S711, the print job processing unit 115 stores the print job into the storage unit 114, and ends the processing of the printing system.

As described above, in the present exemplary embodiment, if the print attribute information included in the print job includes the print attribute indicating to leave the authentication information included in the print job after the completion of the series of print processing, the print job is stored in the printing system with the authentication information left undeleted. On the other hand, if the print attribute indicating to leave the authentication information included in the print job after the completion of the series of print processing is not included (a print attribute for deleting the authentication information is included), the authentication information is deleted before the print job is stored in the printing system. In addition to the effects described in the first exemplary embodiment, there is thus provided the effect of suppressing unconditional deletion of the authentication information included in a print job to be used for reprinting. This can prepare for a use case where the authentication information used when a print job is generated is desired to be used successively even at the time of reprinting. The printing system can thus be adapted to various printing workflows with improved convenience.

The present exemplary embodiment has been described by taking an example in which the print attribute information included in the print job includes the print attribute indicating whether to leave the authentication information. However, the method for setting whether to leave authentication information is not limited to such a method.

For example, the operation settings of the entire image processing apparatus 102 may include an option for the authentication information management setting, whereby an operation of the entire printing system may be switched. More specifically, if an option for deleting authentication information is set as the option for the authentication information management setting, the authentication information that is one of the pieces of print attribute information included in the print job is deleted after the completion of the series of processing. The print job is then stored in the printing system. On the other hand, if an option indicating to leave the authentication information is set as the option for the authentication information management setting, the authentication information that is one of the pieces of print attribute information included in the print job is left undeleted and the print job is stored in the printing system after the completion of the series of processing.

Next, a third exemplary embodiment will be described in detail.

In the first and second exemplary embodiments, the user information required for the authentication in the printing system among the print attributes included in a print job is deleted when the print job is stored in the printing system after the completion of a series of image processing of the print job. However, the usage of the printing system, or a printing workflow, varies depending on the printing environment in the printing system. For example, in a printing environment where print jobs are less frequently to be reprinted, the authentication information may not necessarily need to be deleted after the completion of the image processing in view of productivity and processing efficiency of the printing system.

In the present exemplary embodiment, after the completion of a series of print processing on a print job, the print job is stored with the authentication information required for authentication in the printing system left undeleted among the print attributes included in the print job. The authentication information included in the print job is then deleted when the state of the print job thus stored in a printed state is shifted to a different state of the print job. More specifically, when a print job printed in the past is re-executed or when a print job printed in the past is moved to the hold queue 307, the authentication information that is one of the print attributes included in the print job is deleted. The timing to delete the authentication information may be before or after the shift of the state of the print job to another state of the print job as long as it is after the image processing apparatus 102 is instructed to shift the state of the print job to another state of the print job.

As described above, similar to the first and second exemplary embodiments, the present exemplary embodiment enables proper authentication based on the authentication information about the user who actually executes the print job, so that, for example, various types of counting related to printing can be performed correctly. The present exemplary embodiment also enables an improvement of the productivity and processing efficiency of the printing system in addition to the improvement of the reliability and security of the authentication function while maintaining the function of storing a print job.

The present exemplary embodiment differs from the first and second exemplary embodiments mainly in the configuration and processing due to a difference in the timing of deletion of the authentication information. In the description of the present exemplary embodiment, similar parts to those of the first and second exemplary embodiments are therefore designated by the same reference numerals as those used in FIGS. 1 to 9. A detailed description thereof will be omitted.

First, the paths of a print job in the image processing apparatus 102 according to the present exemplary embodiment and an example of control of the print job in each path will be described with reference to FIG. 3.

Similar to the image processing apparatus 102 according to the first exemplary embodiment, the image processing apparatus 102 according to the present exemplary embodiment includes three queues (three paths 301, 302, and 303 (paths A, B, and C)) for a print job transmitted from the client computer 101. Similar to the first exemplary embodiment, the image processing apparatus 102 further includes three paths 312, 313, and 314 (paths D, E, and F) for editing and re-executing a print job stored in the storage unit 114. Similar to the first exemplary embodiment, the print job stored in the storage unit 114 is classified as either one of a printed job 311 and a hold job 308.

The present exemplary embodiment and the first exemplary embodiment differ in part of the processing in the paths 303, 312, and 313 (paths C, D, and E). Therefore, only the processing in the paths 303, 312, and 313 will be described below, and a detailed description of the processing in the other paths 301, 302, and 314 (paths A, B, and F) will be omitted.

The path 303 (path C) refers to a path of print processing in a case where a print job is transmitted from the client computer 101 to the print queue 309. The image processing apparatus 102 receives the print job from the client computer 101 by the print queue 309. If a series of print processing 310 on the print job is completed, the image processing apparatus 102 stores the print job into the storage unit 114 as a printed job 311. This storing processing is different from that of the first exemplary embodiment. In the present exemplary embodiment, the image processing apparatus 102 performs the following processing. When the series of image processing 310 on the print job by the printing apparatus 103 is completed, the image processing apparatus 102 stores the print job into the storage unit 114 as a printed job 311 without deleting the authentication information required for the determination of the authentication unit 122.

The path 312 (path D) refers to a path of a print job when the image processing apparatus 102 re-executes the print job stored in the storage unit 114 as a printed job 311. When the image processing apparatus 102 is instructed to re-execute the print job that is a printed job 311, the image processing apparatus 102 receives the print job by the print queue 309. The image processing apparatus 102 then performs the series of print processing 310 on the print job. When the print processing 310 is completed, the image processing apparatus 102 stores the print job into the storage unit 114 again as a printed job 311. The foregoing processing differs from that of the first exemplary embodiment in the processing when the print job that is a printed job 311 is transmitted to the print queue 309. In the present exemplary embodiment, the image processing apparatus 102 deletes the authentication information required for the determination of the authentication unit 122 among the print attributes included in the print job when the print job that is a printed job 311 is transmitted to the print queue 309 and the state of the print job transitions.

The path 313 (path E) refers to a path of a print job when the state of the print job stored in the storage unit 114 as a printed job 311 is shifted to the state of a hold job 308. When the image processing apparatus 102 is instructed to shift the print job that is a printed job 311 to a hold job 308, the image processing apparatus 102 stores the print job into the storage unit 114 again as a hold job 308. The information about the print attributes included in the print job become changeable only after the print job is stored as a hold job 308. The foregoing processing differs from that of the first exemplary embodiment in the processing when the print job that is a printed job 311 is shifted to a hold job 308. More specifically, in the present exemplary embodiment, the image processing apparatus 102 deletes the authentication information required for the determination of the authentication unit 122 among the print attributes included in the print job when the print job is shifted from a printed job 311 to a hold job 308.

Figure 10:
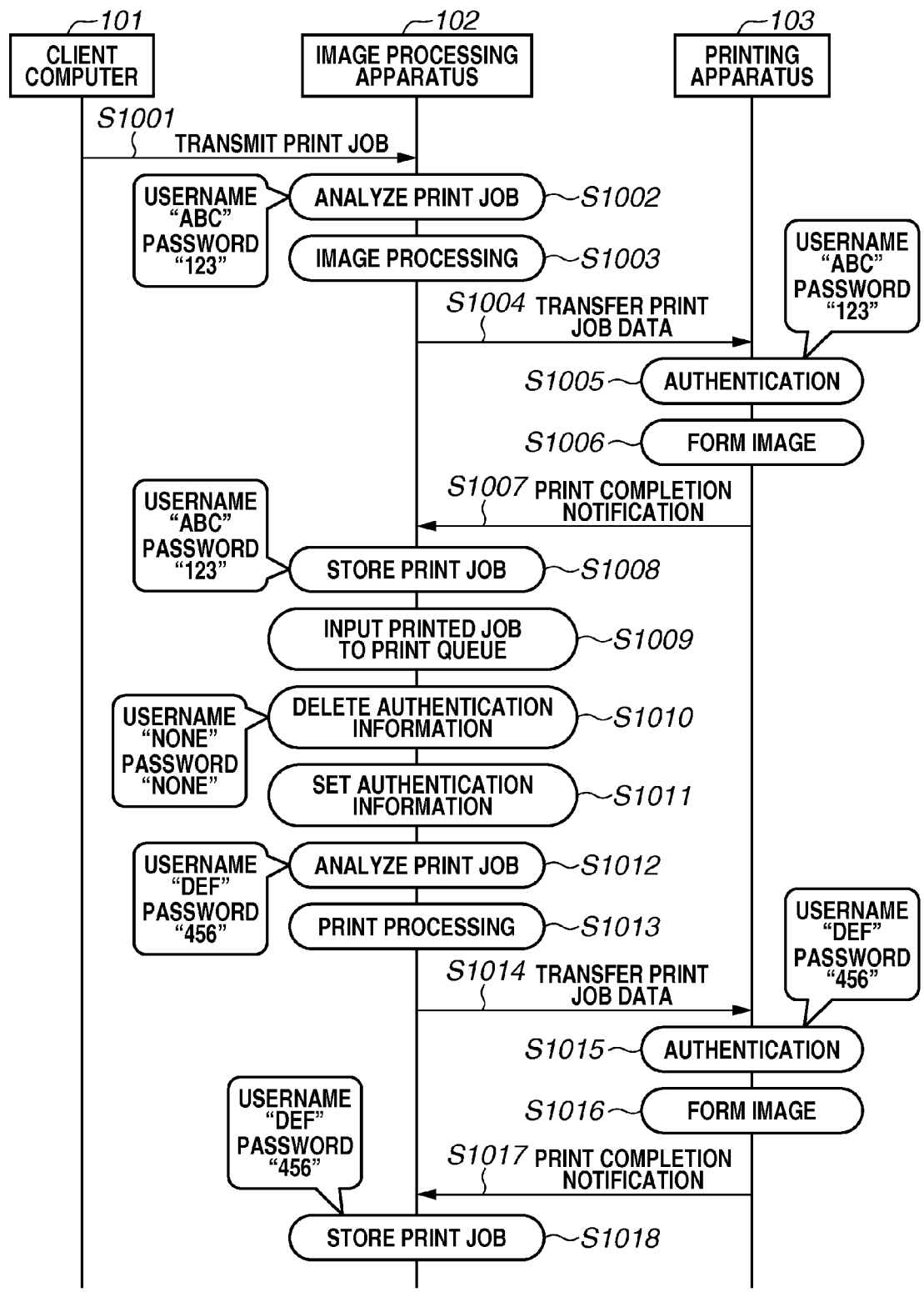
FIG. 10 is a diagram illustrating a third example of the processing of the printing system.

FIG. 10 is a diagram illustrating an example of processing of the printing system when a print job is executed. FIG. 10 illustrates processing sequences of the client computer 101, the image processing apparatus 102, and the printing apparatus 103. In FIG. 10, the time progresses downward from the top.

In step S1001, the image processing apparatus 102 receives a print job from the client computer 101.

In step S1002, the image processing apparatus 102 analyzes the print job received in step S1001.

In the following description, it is assumed that a username "ABC" and a password "123" are obtained through the analysis of the print job as authentication information that is one of the pieces of information about the print attributes included in the print job. For example, the username and the password are authentication information input to the username input area 407 and the password input area 408 of the authentication information setting 406 of the print setting screen 401. Further, it is assumed that the path 303 (path C) is selected as the path of the print job received in step S1001, and the print job is processed by the print queue 309.

In step S1003, the image processing apparatus 102 applies image processing to the print job to obtain print image data.

In step S1004, the image processing apparatus 102 transfers the information about the print attributes including the authentication information obtained in step S1002 and the print image data obtained in step S1003 to the printing apparatus 103 as print job data.

In step S1005, the printing apparatus 103 determines whether to perform the print processing of the print job data, by using the authentication information among the information about the print attributes included in the print job data. The authentication information used at that time is the username "ABC" and the password "123" obtained in step S1002. The specific processing of step S1005 is similar to that of step S505 in FIG. 5 described in the first exemplary embodiment.

In step S1005, if the pieces of authentication information match each other and the print processing of the print job data is determined to be performed, then in step S1006, the printing apparatus 103 forms an image by using the print job data to obtain a print product.

In step S1007, the image processing apparatus 102 receives a print completion notification from the printing apparatus 103, thereby recognizing that the series of print processing in the printing apparatus 103 is completed.

In step S1008, the image processing apparatus 102 stores the print job received in step S1001 into the storage unit 114, and ends the series of processing of the print job through the path 303 (path C). By the processing through the path 303 (path C), the print job is stored into the storage unit 114 as a printed job 311. This print job includes the authentication information that is one of the pieces of information about the print attributes. In other words, at this time point, the authentication information remains in the print job.

The print job stored in the storage unit 114 as a printed job 311 can be reprinted later by the print queue 309. If the image processing apparatus 102 is instructed to re-execute the print job stored in the storage unit 114 as a printed job 311, then in step S1009, the image processing apparatus 102 put the print job into the print queue 309 by the processing through the path 312 (path D). In such a manner, the image processing apparatus 102 reprints the print job on which the print processing has been completed in the past and stored in a printed state (shift the state of the print job from storage to a print queue).

In step S1010, the image processing apparatus 102 deletes the authentication information that is one of the pieces of information about the print attributes included in the print job input in the print queue 309. More specifically, at that time, the image processing apparatus 102 deletes both the pieces of authentication information, i.e., the username "ABC" which is one of the pieces of authentication information and the password "123" which is the other piece of authentication information.

In step S1011, since the authentication information that is one of the pieces of information about the print attributes included in the print job is deleted in step S1010, the image processing apparatus 102 sets authentication information for the print job.

For example, in the present exemplary embodiment, as will be described below with reference to FIG. 12, the image processing apparatus 102 displays an input screen through which the user who executes the print job can specify arbitrary authentication information. The image processing apparatus 102 applies information input to the input screen to the print job as new authentication information.

In another example, login information of the printing system about the user who executes the print job may be applied to the print job as new authentication information. In yet another example, setting information stored in the printing system in advance as authentication information may be applied to the print job as new authentication information. In any case, the past authentication information having been included in the print job input in the print queue 309 is deleted in step S1010. Therefore, the print job therefore will not be successfully authenticated by the printing apparatus 103 unless new authentication information is set for the print job.

In step S1012, the image processing apparatus 102 analyzes the print job input to the print queue 309. In the following description, it is assumed that a username "DEF" and a password "456" are obtained by the analysis of the print job input to the print queue 309 as the authentication information that is one of the pieces of information about the print attributes included in the print job. It is also assumed that the path of the print job is the path 312 (path D), and the print job is processed by the print queue 309.

In step S1013, the image processing apparatus 102 applies image processing to the print job input to the print queue 309 to obtain print image data.

In step S1014, the image processing apparatus 102 transfers the information about the print attributes including the authentication information obtained in step S1012 and the print image data obtained in step S1013 to the printing apparatus 103 as print job data.

In step S1015, the printing apparatus 103 determines whether to perform the print processing of the print job data, by using the authentication information among the information about the print attributes included in the print job data. In the following description, the authentication information included in the print job data is the username "DEF" and the password "456" obtained in step S1012. If authentication information defined in the printing apparatus 103 in advance and the authentication information included in the print job data are determined to match each other, the printing apparatus 103 continues the print processing. On the other hand, if the authentication information defined in the printing apparatus in advance does not match the authentication information included in the print job, the printing apparatus 103 aborts the print processing.

In step S1015, if the pieces of authentication information match each other and the print processing of the print job data is determined to be performed, then in step S1016, the printing apparatus 103 forms an image by using the print job data to obtain a print product.

In step S1017, the image processing apparatus 102 receives a print completion notification from the printing apparatus 103, thereby recognizing that a series of print processing in the printing apparatus 103 is completed.

In step S1018, the image processing apparatus 102 stores the reprinted print job into the storage unit 114, and ends the series of processing of the print job through the path 312 (path D). By the processing through the path 312 (path D), the reprinting-completed print job is stored into the storage unit 114 as a printed job 311. As described above, the print attributes included in this print job are in a state of including the authentication information. In other words, at this time point, the authentication information remains in the print job.

The image processing apparatus 102 may delete the authentication information (i.e., may perform the processing in step S1010) before the print job stored as a printed job 311 is input to the print queue 309 as long as it is, for example, after the image processing apparatus 102 is instructed to re-execute the print job stored as a printed job 311.

Figure 11:
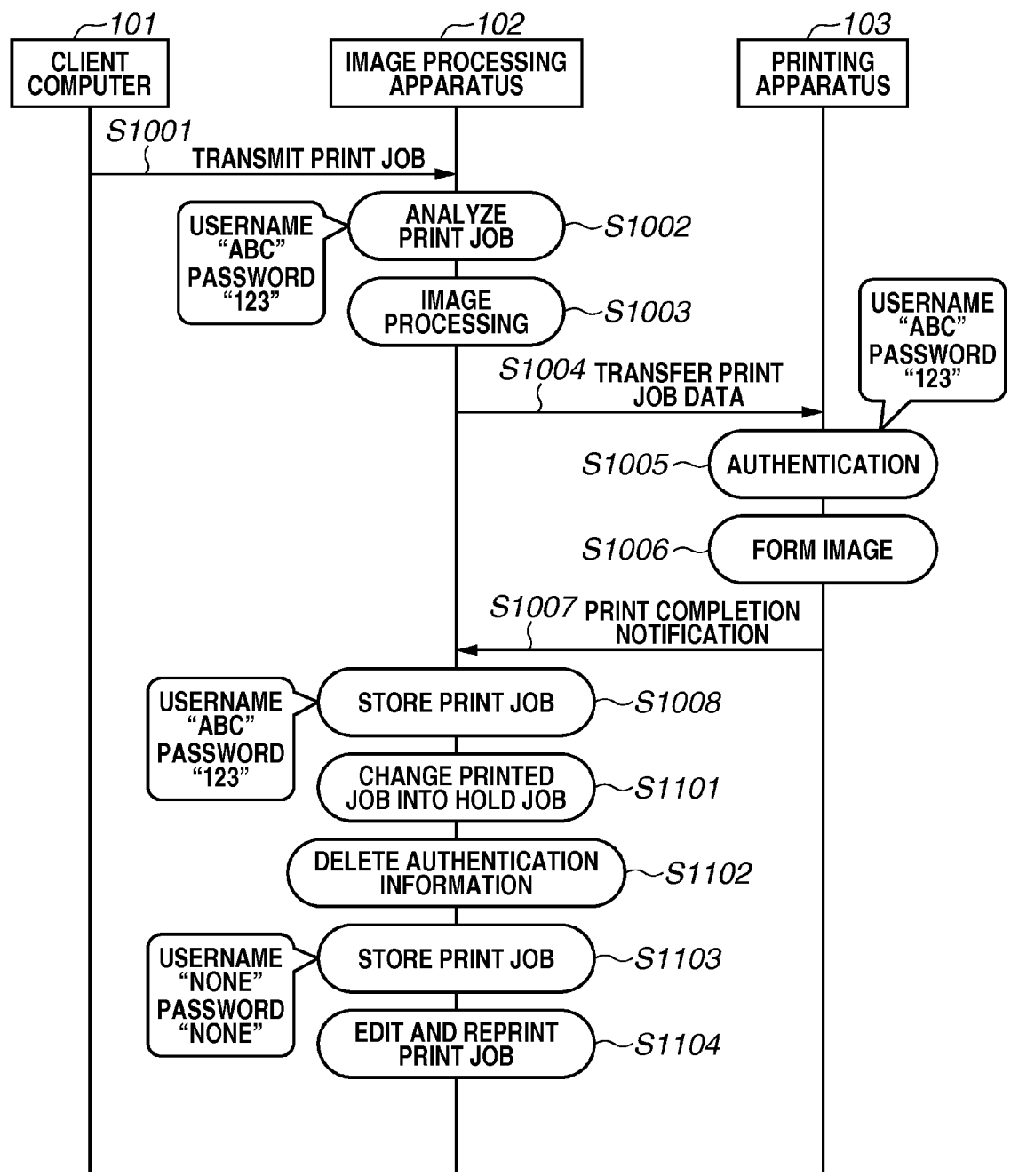
FIG. 11 is a diagram illustrating a fourth example of the processing of the printing system.

FIG. 11 is a diagram illustrating another example of processing of the printing system when a print job is executed. Similar to FIG. 10, FIG. 11 illustrates the processing sequences of the client computer 101, the image processing apparatus 102, and the printing apparatus 103. In FIG. 11, similar to FIG. 10, the time progresses downward from the top.

Steps S1001 to S1008 are similar to those illustrated in FIG. 10.

More specifically, in steps S1001 and S1002, the image processing apparatus 102 receives and analyzes a print job transmitted from the client computer 101. In the following description, similar to FIG. 10, it is assumed that a username "ABC" and a password "123" are obtained as the authentication information that is one of the pieces of information about the print attributes included in the print job. It is also assumed that the path 303 (path C) is selected as the path of the print job received in step S1001, and the print job is processed by the print queue 309.

In step S1003, the image processing apparatus 102 applies image processing to the print job to obtain print image data. In step S1004, the image processing apparatus 102 transfers the information about the print attributes including the authentication information obtained in step S1002 and the print image data obtained in step S1003 to the printing apparatus 103 as print job data.

In step S1005, the printing apparatus 103 determines whether to perform the print processing of the print job data, by using the authentication information among the information about the print attributes included in the print job data. The authentication information used at that time is the username "ABC" and the password "123" obtained in step S1002.

In step S1005, if the pieces of authentication information match each other and the print processing of the print job data is determined to be performed, then in step S1006, the printing apparatus 103 forms an image by using the print job data to obtain a print product.

In step S1007, the image processing apparatus 102 receives a print completion notification from the printing apparatus 103, thereby recognizing that a series of print processing in the printing apparatus 103 is completed.

In step S1008, the image processing apparatus 102 stores the print job received in step S1001 into the storage unit 114, and ends the series of processing of the print job through the path 303 (path C). By the processing through the path 303 (path C), the print job is stored into the storage unit 114 as a printed job 311. As described above, at this time point, the authentication information remains in the print job.

The print job stored in the storage unit 114 as a printed job 311 is changed later into a hold job 308 inside the storage unit 114. This enables editing and reprinting of the print job. If the image processing apparatus 102 is instructed to change the print job into a hold job 308, then in step S1101, the image processing apparatus 102 changes the print job into a hold job 308 through the path 313 (path E). Here, the print job on which the print processing has been completed in the past and stored in a printed state is changed into a hold job 308. In other words, the image processing apparatus 102 shifts the state of the print job to the state of a hold job 308.

In step S1102, the image processing apparatus 102 deletes the authentication information that is one of the pieces of information about the print attributes included in the print job. More specifically, after changing the print job into a hold job 308, the image processing apparatus 102 deletes both the pieces of authentication information, i.e., the username "ABC" which is one of the pieces of authentication information and the password "123" which is the other piece of authentication information.

In step S1103, the image processing apparatus 102 stores the print job into the storage unit 114 as a hold job 308, and ends the series of processing of the print job through the path 313 (path E). In step S1104, the print job stored as a hold job 308 can be edited and reprinted.

The image processing apparatus 102 may delete the authentication information (i.e., may perform the processing in step S1102) before changing the print job stored in the storage unit 114 as a printed job 311 into a hold job 308 as long as it is, for example, after the image processing apparatus 102 is instructed to change the print job into a hold job 308.

Figure 12:
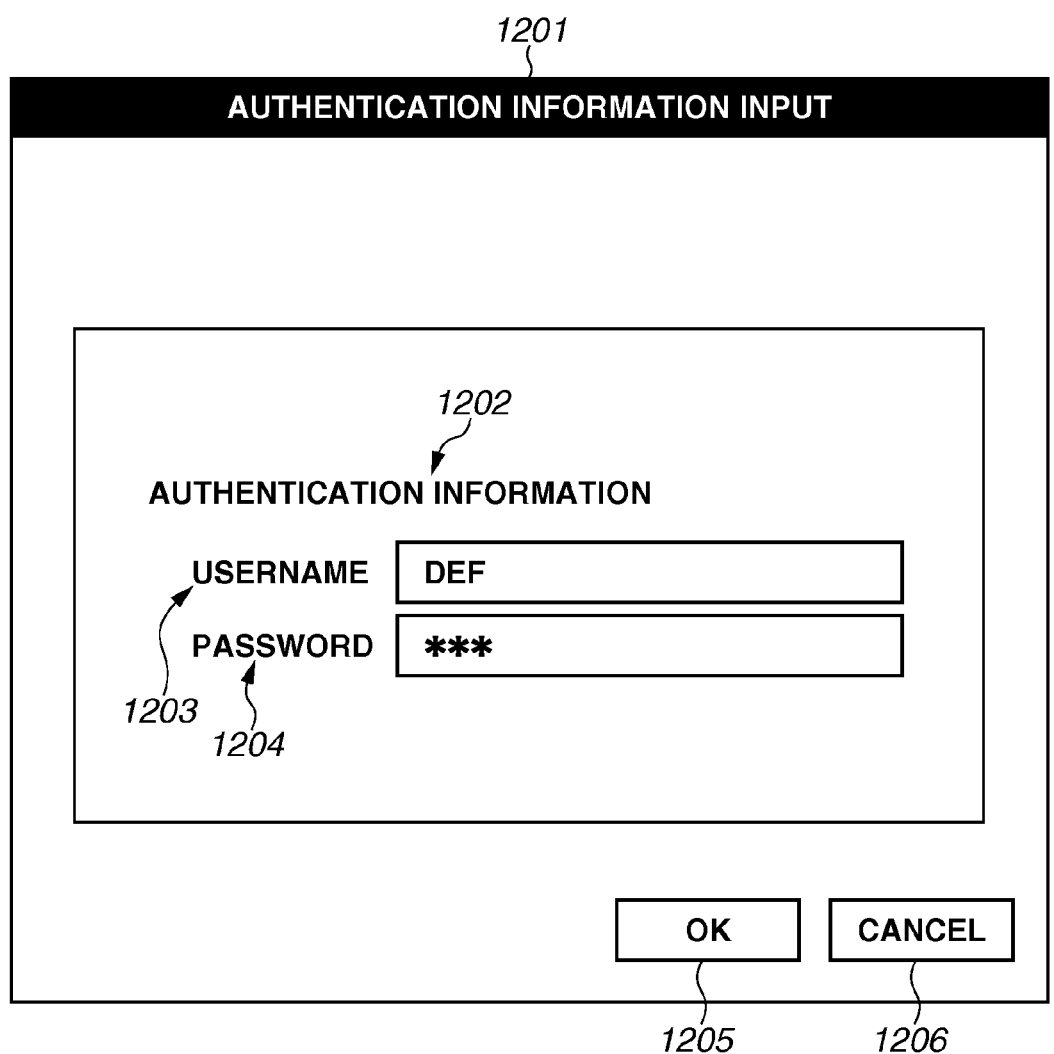
FIG. 12 is a diagram illustrating a method for setting authentication information.

FIG. 12 is a diagram illustrating an example of a method for setting authentication information among the information about the print attributes included in a print job.

An authentication information input screen 1201 is a UI that is displayed when a print job is reprinted. The UI of the authentication information input screen 1201 is displayed as an input screen through which the user who executes the print job can specify arbitrary authentication information. For example, the UI of the authentication information input screen 1201 is displayed in the printing system. The UI of the authentication information input screen 1201 may also be displayed, for example, by accessing the image processing apparatus 102 from the client computer 101 via the network 104 by using dedicated utility software or a browser. The UI of the authentication information screen 1201 may be displayed by other methods.

The authentication information input screen 1201 is a UI that includes input items of an authentication information attribute 1202, and is intended to input authentication information among the information about the print attributes of the print job. The authentication information input screen 1201 further includes an OK button 1205 and a cancel button 1206.

The input items of the authentication information attribute 1202 include a username input area 1203 and a password input area 1204. The authentication information attribute 1202 is a UI for setting the authentication information required for the determination of the authentication unit 122 among the information about the print attributes included in the print job. In the present exemplary embodiment, an example is described where the authentication information required for the determination of the authentication unit 122 includes a username with which the print job is executed in the printing system, and a password of the user having the username.

The username input area 1203 is a UI for inputting the username with which the print job is executed in the printing system among the authentication information required for the determination of the authentication unit 122.

The password input area 1204 is a UI for inputting the password to be paired with the username with which the print job is executed in the printing system among the authentication information required for the determination of the authentication unit 122.

The authentication information input to the username input area 1203 and the password input area 1204 is processed by the image processing apparatus 102 as part of the print attribute information included in the print job. Then, the printing apparatus 103 uses the authentication information input to the username input area 1203 and the password input area 1204 for the authentication processing by the authentication unit 122 as part of print job data. The print processing of the print job data is continued only if the authentication information defined in the printing apparatus 103 in advance matches the authentication information included in the print job data (the authentication information input to the username input area 1203 and the password input area 1204).

The OK button 1205 is a UI for storing the information input to the authentication information input screen 1201. If the area corresponding to the OK button 1205 on the GUI is pressed, the information input to the authentication information input screen 1201 is stored and the authentication information input screen 1201 is closed.

The cancel button 1206 is a UI for cancelling the information input to the authentication information input screen 1201. If the area corresponding to the cancel button 1206 on the GUI is pressed, the information input to the authentication information input screen 1201 is discarded and the authentication information input screen 1201 is closed.

The authentication information may be input by using the print setting screen 401 described in the first exemplary embodiment.

Figure 13:
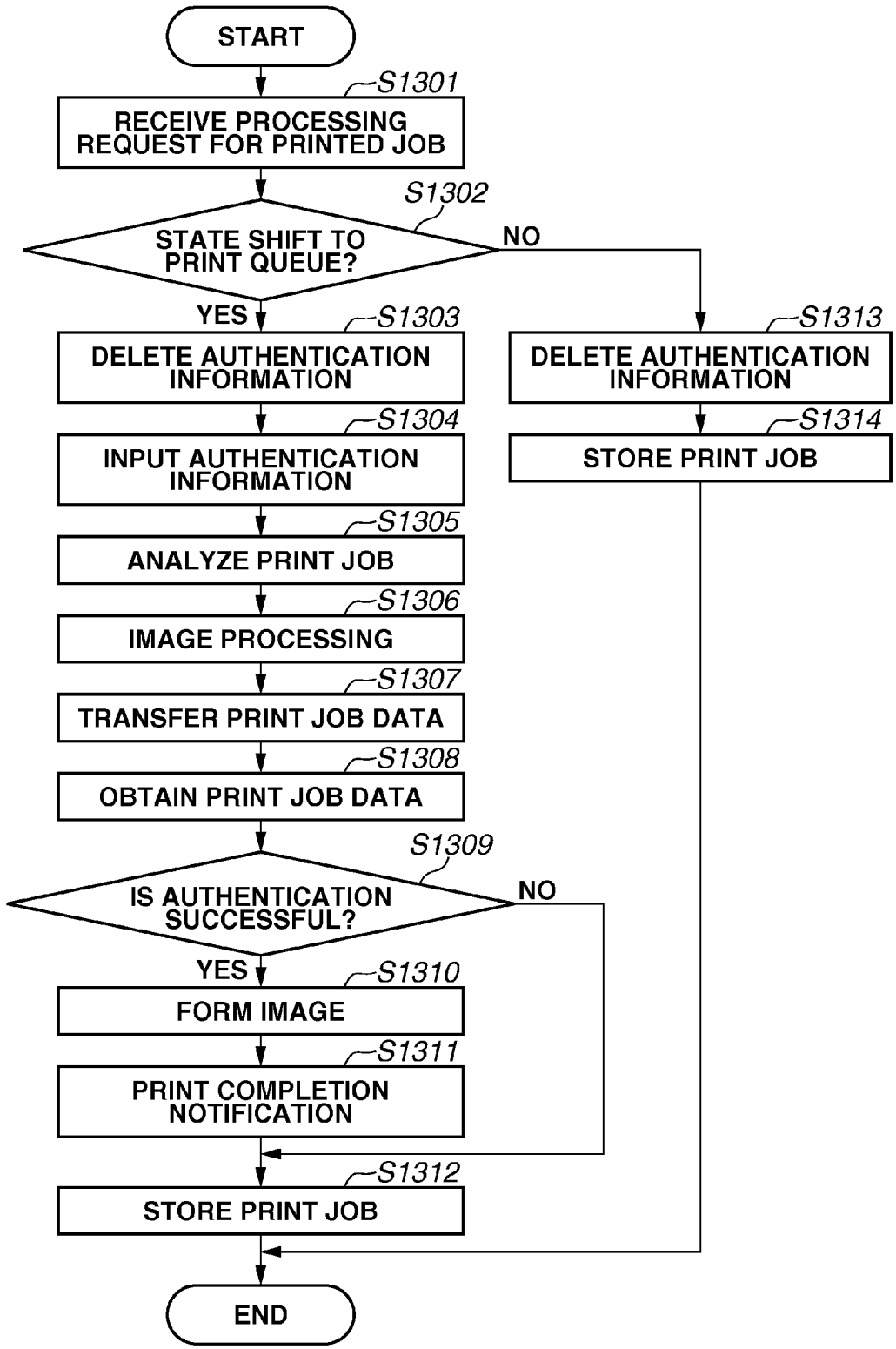
FIG. 13 is a flowchart illustrating a third example of the processing of the printing system.

FIG. 13 is a flowchart illustrating an example of processing of the printing system when a print job stored as a printed job is processed. This flowchart is implemented by the processing of the following hardware. In the image processing apparatus 102, the print job processing unit 115 performs processing to implement the flowchart according to a program stored in the storage unit 114. In the printing apparatus 103, the print job data processing unit 127 performs processing to implement the flowchart according to a program stored in the storage unit 120.

In step S1301, the print job processing unit 115 receives a processing request that a print job stored in the storage unit 114 as a printed job 311 be processed through the path 312 (path D) or the path 313 (path E), and starts the processing of the printing system. The processing request is issued by the operator of the print job.

In step S1302, the print job processing unit 115 determines whether the processing request for the printed job 311 is to shift a state to the print queue 309 (processing through the path 312 (path D)).

If the processing request for the printed job 311 is determined not to shift a state to the print queue 309 (NO in step S1302), the processing request for the printed job 311 is to shift a state to a hold job 308 (processing through the path 313 (path E)). In this case, the processing proceeds to step S1313 to be described below.

On the other hand, if the processing request for the printed job 311 is to shift a state to the print queue 309 (YES in step S1302), the processing proceeds to step S1303. In step S1303, the print job processing unit 115 deletes the authentication information that is one of the pieces of information about the print attributes included in the print job.

In step S1304, the print job processing unit 115 displays an input screen through which the user who executes the print job can specify arbitrary authentication information such as the authentication information input screen 1201 illustrated in FIG. 12. The print job processing unit 115 then applies information input to the input screen to the print job as new authentication information.

In step S1305, the print job processing unit 115 analyzes the print job to obtain print image information and print attribute information. The print attribute information includes the authentication information.

In step S1306, the print job processing unit 115 instructs the image processing unit 113 to apply image processing to drawing data included in the print job. As a result, the image processing unit 113 performs the image processing. The print job processing unit 115 then obtains print image data from the image processing unit 113.

In step S1307, the print job processing unit 115 transfers the print attribute information including the authentication information obtained in step S1305 and the print image data obtained in step S1306 to the printing apparatus 103 as print job data.

In step S1308, the print job data processing unit 127 obtains the print job data transferred from the image processing apparatus 102.

In step S1309, the print job data processing unit 127 instructs the authentication unit 122 to perform authentication on the print job data obtained in step S1308. If authentication information defined in the printing apparatus 103 matches the authentication information included in the print job data obtained in step S1308, the authentication unit 122 determines that the authentication is successful. If not, the authentication unit 122 determines that the authentication is failed. Based on the result of the authentication by the authentication unit 122, the print job data processing unit 127 determines whether to perform the print processing of the print job data obtained in step S1308 (whether the authentication is successful).

If the print processing of the print job data is determined not to be performed (the authentication is failed) (NO in step S1309), the processing proceeds to step S1312, skipping steps S1310 and S1311.

On the other hand, if the print processing of the print job data is to be performed (the authentication is successful) (YES in step S1309), the processing proceeds to step S1310. In step S1310, the print job data processing unit 127 instructs the image forming unit 123 to form an image based on the print image data. As a result, the image forming unit 123 forms an image based on the print image data obtained in step S1308 to obtain a print product.

In step S1311, the print job data processing unit 127 issues a print completion notification to the image processing apparatus 102. The print job processing unit 115 receives the print completion notification from the printing apparatus 103.

In step S1312, the print job processing unit 115 stores the print job into the storage unit 114 as a printed job 311, and ends the processing of the printing system.

As described above, in step S1302, if the processing request for the printed job 311 is determined not to shift a state to the print queue 309 (NO in step S1302), the processing proceeds to step S1313. In step S1313, the print job processing unit 115 deletes the authentication information that is one of the pieces of information about the print attributes included in the print job.

In step S1314, the print job processing unit 115 stores the print job into the storage unit 114 as a hold job 308, and ends the processing of the printing system.

In addition, the processing of steps S1303 and S1304 may be performed, for example, after the end of step S1305 and before the start of step S1307. The processing of steps S1313 and S1314 may be changed in order.

As described above, according to the present exemplary embodiment, the print job to be used for reprinting is stored with the authentication information included. The authentication information is deleted when the state of the print job is changed. Similar to the first exemplary embodiment, for example, through this processing, it is possible to suppress a possibility that a user who gives instructions to reprint the print job and a user who performs authentication in the printing system are different. The printing system can thus properly perform authentication based on the user information about the user who actually executes the print job, and various types of counting related to printing. According to the present exemplary embodiment, a printing system that has the function of storing a print job and improves the reliability and security of the authentication function can thus be achieved. Moreover, according to the present exemplary embodiment, the foregoing effects can be provided even if the authentication information does not need to be deleted after the completion of the print processing in view of the productivity and processing efficiency of the printing system.

OTHER EMBODIMENTS

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-177133, filed Sep. 1, 2014, which is hereby incorporated by reference herein in its entirety.

What is claimed is:
1. A printing system which includes an image processing apparatus and a printing apparatus, wherein the image processing apparatus comprises:
a memory storing instructions; and a processor coupled to the memory that executes the instructions that controls the processor to operate as a receiving unit configured to receive a print job transmitted from an information processing apparatus, the received print job including print image information and user authentication information;

a generating unit configured to generate print image data based on the print image information included in the received print job;

a transmitting unit configured to transmit print job data including the print image data generated by the generating unit and the user authentication information included in the received print job, to the printing apparatus;

the printing apparatus comprises:

an authentication unit configured to perform authentication based on the user authentication information included in the print job data transmitted from the image processing apparatus;

a printing unit configured to perform print processing based on the print image data included in the print job data according to a success of the authentication;

the image processing apparatus further comprises:

a control unit configured to perform control of not using the user authentication information included in the received print job when reprint processing based on the received print job is performed after completion of the print processing performed by the printing unit.

2. A control method for an image processing apparatus that is communicable with a printing apparatus, the control method for the image processing apparatus comprising:

receiving a print job transmitted from an information processing apparatus, the received print job including print image information and user authentication information;

generating print image data based on the print image information included in the received print job;

transmitting print job data including the generated print image data and the user authentication information included in the received print job, to the printing apparatus;

performing control to not use the user authentication information included in the received print job when reprint processing based on the received print job is performed after completion of the print processing performed on the basis of the print job data by the printing apparatus;

wherein the printing apparatus performs authentication based on the user authentication information included in the transmitted print job data and performs the print processing based on the print image data included in the print job data according to success of the authentication.

3. A non-transitory computer-readable storage medium storing computer executable instructions for causing a computer to execute a control method for an image processing apparatus that is communicable with a printing apparatus, the control method for the image processing apparatus comprising:

receiving a print job transmitted from an information processing apparatus, the received print job including print image information and user authentication information;

generating print image data based on the print image information included in the received print job;

transmitting print job data including the generated print image data and the user authentication information included in the received print job, to the printing apparatus;

performing control to not use the user authentication information included in the received print job when reprint processing based on the received print job is performed after completion of print processing performed on the basis of the print job data by the printing apparatus;

wherein the printing apparatus performs authentication based on the user authentication information included in the transmitted print job data and performs the print processing based on the print image data included in the print job data according to success the authentication.

4. An image processing apparatus which is communicable with a printing apparatus, the image processing apparatus comprising:

a memory storing instructions; and a processor coupled to the memory that executes the instructions that controls the processor to operate as a receiving unit configured to receive a print job transmitted from an information processing apparatus, the received print job including print image information and user authentication information;

a generating unit configured to generate print image data based on the print image information included in the received print job;

a transmitting unit configured to transmit print job data including the print image data generated by the generating unit and the user authentication information included in the received print job, to the printing apparatus; and a control unit configured to perform control of not using the user authentication information included in the received print job when reprint processing based on the received print job is performed after completion of print processing performed on the basis of the print job data by the printing apparatus;

wherein the printing apparatus performs authentication based on the user authentication information included in the print job data transmitted by the transmitting unit, and performs print processing based on the print image data included in the print job data according to a success of the authentication.

5. The image processing apparatus according to claim 4, wherein, after the completion at the print processing, the control unit stores the received print job including the user authentication information into a memory as a printed job, and wherein the control unit deletes the user authentication information included in the received print job in accordance with an instruction for reprint processing of the received print job stored into the memory as the printed job.

6. The image processing apparatus according to claim 4, wherein, upon the completion of the print processing performed by the printing apparatus, the control unit stores the received print job from which the user authentication information has been deleted into a memory as a printed job for a purpose of reprint processing.

7. The image processing apparatus according to claim 6, wherein, in a case where the received print job includes setting of deleting the user authentication information, upon the completion of the print processing, the control unit stores the received print job from which the user authentication information has been deleted into the memory as the printed job, in a case where the received print job includes setting of not deleting the user authentication information, upon the completion of the print processing, the control unit stores the received print job into the memory as the printed job, without deleting the user authentication information included in the received print job.

8. The image processing apparatus according to claim 6, further comprising a setting unit configured to, after the user authentication information included in the received print job is deleted, set new user authentication information in the received print job.

9. The image processing apparatus according to claim 8, wherein the new user authentication information includes any one of:

information that is input, after the user authentication information included in the received print job is deleted, by a user who gives an instruction to perform reprint processing on the received print job, login information input by the user who gives the instruction to perform reprint processing on the received print job when the user gives the instruction to perform the reprint processing on the received print job, and information stored in advance.

10. The image processing apparatus according to claim 6, wherein the received print job includes print attribute information that contains the user authentication information; and wherein the control unit stores the received print job including the print attribute information excluding the user authentication information into the memory as the printed job.

11. The image processing apparatus according to claim 10, wherein the print attribute information excluding the user authentication information includes at least one of page settings, paper feeding settings, and finishing settings.

* * * * *